(12) United States Patent
Berestovsky et al.

(10) Patent No.: US 12,417,649 B2
(45) Date of Patent: Sep. 16, 2025

(54) TABLE INFORMATION EXTRACTION AND MAPPING TO OTHER DOCUMENTS

(71) Applicant: Bill Operations, LLC, San Jose, CA (US)

(72) Inventors: Natalia Berestovsky, Katy, TX (US); Stefano Andrea Romano, Houston, TX (US); Ricardo Antonio Fernandez, Katy, TX (US); Joseph Michael Price, Houston, TX (US)

(73) Assignee: Bill Operations, LLC, San Jose, CA (US)

( * ) Notice: Subject to any disclaimer, the term of this patent is extended or adjusted under 35 U.S.C. 154(b) by 0 days.

(21) Appl. No.: 18/744,316

(22) Filed: Jun. 14, 2024

(65) Prior Publication Data
US 2024/0331431 A1   Oct. 3, 2024

Related U.S. Application Data

(63) Continuation of application No. 17/461,120, filed on Aug. 30, 2021, now Pat. No. 12,046,063.

(51) Int. Cl.

| | |
|---|---|
| *G06F 16/00* | (2019.01) |
| *G06F 18/22* | (2023.01) |
| *G06F 40/177* | (2020.01) |
| *G06F 40/20* | (2020.01) |
| *G06F 40/30* | (2020.01) |
| *G06V 30/14* | (2022.01) |
| *G06V 30/412* | (2022.01) |
| *G06V 30/413* | (2022.01) |
| *G06V 30/414* | (2022.01) |
| *G06V 30/18* | (2022.01) |

(52) U.S. Cl.
CPC ............ *G06V 30/412* (2022.01); *G06F 18/22* (2023.01); *G06F 40/30* (2020.01); *G06V 30/1448* (2022.01); *G06V 30/413* (2022.01); *G06V 30/414* (2022.01); *G06V 30/18067* (2022.01); *G06V 2201/07* (2022.01)

(58) Field of Classification Search
USPC .............. 382/112–133, 154–229; 706/1–62, 706/900–903; 707/700–765; 715/200–277
See application file for complete search history.

(56) References Cited

U.S. PATENT DOCUMENTS

| | | |
|---|---|---|
| 5,272,628 A | 12/1993 | Koss |
| 11,017,312 B2 * | 5/2021 | Byron .................... G06N 5/041 |
| 11,636,462 B2 | 4/2023 | Ng et al. |

(Continued)

OTHER PUBLICATIONS

Ochiai Yukitaka; Financial Document Creation Program and Financial Document Creation Method; 2014 (Year: 2014).*

(Continued)

*Primary Examiner* — Marcellus J Augustin
(74) *Attorney, Agent, or Firm* — Shook, Hardy & Bacon LLP

(57) ABSTRACT

The accuracy of existing machine learning models, software technologies, and computers are improved by using one or more machine learning models to map data inside structural elements, such as rows or columns, as found within a document to data objects of other documents, where the data objects are at least partially indicative of candidate categories that the data can belong to.

20 Claims, 19 Drawing Sheets

(56) References Cited

U.S. PATENT DOCUMENTS

| | | | |
|---|---|---|---|
| 11,782,928 B2* | 10/2023 | Chan | G06F 40/177 |
| | | | 707/769 |
| 12,190,620 B2* | 1/2025 | Sathi | G06Q 10/10 |
| 2007/0041041 A1* | 2/2007 | Engbrocks | G06F 3/1285 |
| | | | 358/1.15 |
| 2009/0271297 A1* | 10/2009 | McCracken | H04L 12/14 |
| | | | 705/28 |
| 2012/0011123 A1 | 1/2012 | Nagel et al. | |
| 2015/0121188 A1 | 4/2015 | Bissantz | |
| 2017/0154025 A1* | 6/2017 | Déjean | G06F 40/14 |
| 2018/0025037 A1* | 1/2018 | Nos | G06F 16/2282 |
| | | | 707/741 |
| 2020/0097451 A1 | 3/2020 | Pisipati et al. | |
| 2020/0175267 A1* | 6/2020 | Schäfer | G06V 30/413 |
| 2021/0240976 A1* | 8/2021 | Tiyyagura | G06V 30/414 |
| 2021/0406266 A1 | 12/2021 | Chan et al. | |
| 2021/0406533 A1* | 12/2021 | Arroyo | G06F 40/177 |
| 2022/0108107 A1* | 4/2022 | Sathi | G06F 40/20 |
| 2022/0108108 A1 | 4/2022 | Sathi et al. | |

OTHER PUBLICATIONS

Holecek M., et al., "Table understanding in structured documents", In International Conference on Document Analysis and Recognition Workshops (ICDARW), IEEE, pp. 158-164 (2019).

Maurya, C., K., et al., "Online Similarity Learning with Feedback for Invoice Line Item Matching", Department of Data Science and Engineering, arXiv:2001.00288v1, pp. 1-8 (Jan. 2, 2020).

\* cited by examiner

| Table Prob = 1.00 | DESCRIPTION | PATIENT'S NAME | CHARGES | CREDITS |
|---|---|---|---|---|
| 09/23/2020 | Balance Forward | | 0.00 | |
| * 09/16/2020 | Unspecified prev procedure, B/R | Jane | 10.00 | |
| * 09/16/2020 | Prophylaxis-adult | Jane | 50.00 | |
| * 09/16/2020 | Topical Application of Fluoride | Jane | 16.00 | |
| * 09/16/2020 | Intraoral-complete series (bw) | Jane | 67.00 | |
| * 09/16/2020 | Comprehensive oral evaluation | Jane | 38.00 | |
| 09/29/2020 | Dental Ins Pmt{09/16/2020} ABC Insurance | Jane | | -181.00 |
| * 10/06/2020 | Resin-two surfaces, anterior | Jane | 107.00 | |
| * 10/06/2020 | Resin-three surfaces, anterior | Jane | 127.00 | |
| * 10/06/2020 | Unspecified prev procedure, B/R | Jane | 10.00 | |
| 10/23/2020 | Dental Ins Pmt{10/06/2020} ABC Insurance | Jane | | -165.60 |
| 10/06/2020 | Credit Card Payment – Thank You | Jane | | -68.40 |
| * 10/05/2020 | Unspecified prev procedure, B/R | John | 10.00 | |
| * 10/05/2020 | Prophylaxis-adult | John | 50.00 | |
| * 10/05/2020 | Intraoral-complete series (bw) | John | 67.00 | |
| * 10/05/2020 | Comprehensive oral evaluation | John | 38.00 | |
| 10/23/2020 | Dental Ins Pmt{10/05/2020} ABC Insurance | John | | -165.00 |

* Indicates that Dental Insurance has been billed.

| PRIOR BALANCE | CURRENT CREDITS | CURRENT CHARGES | NEW BALANCE |
|---|---|---|---|
| 0.00 | -580.00 | 590.00 | 10.00 |

Insurance Estimates ("Ins. Est.") and "Please Pay" amounts based on insurance estimates are provided as a courtesy. In the event that your Insurance carrier pays less than the estimated amount, you are responsible for the unpaid balance.

| Suite | Due Date | Description | Amount |
|---|---|---|---|
| 100 | 06-01-2020 | Amortization Charge | 445.79 |
| 100 | 06-01-2020 | Amortization | 202.85 |
| 100 | 06-01-2020 | Operating Expense Charge | 2,911.89 |
| 100 | 06-01-2020 | Suite Rent Charge | 5,970.00 |
| 100 | 06-01-2020 | Real Estate Tax Charge | 1,276.13 |
| 114 | 06-01-2020 | Operating Expense Charge | 826.21 |
| 114 | 06-01-2020 | Suite Rent Charge | 1,284.00 |
| 114 | 06-01-2020 | Real Estate Tax Charge | 274.43 |
| 120 | 06-01-2020 | Operating Expense Charge | 699.25 |
| 120 | 06-01-2020 | Suite Rent Charge | 1,434.00 |
| 120 | 06-01-2020 | Real Estate Tax Charge | 308.45 |

*FIG. 6A.*

| Suite | Due Date | Description | Amount |
|---|---|---|---|
| 100 | 06-01-2020 | Amortization Charge | 445.79 |
| 100 | 06-01-2020 | Amortization | 202.85 |
| 100 | 06-01-2020 | Operating Expense Charge | 2,911.89 |
| 100 | 06-01-2020 | Suite Rent Charge | 5,970.00 |
| 100 | 06-01-2020 | Real Estate Tax Charge | 1,276.13 |
| 114 | 06-01-2020 | Operating Expense Charge | 826.21 |
| 114 | 06-01-2020 | Suite Rent Charge | 1,284.00 |
| 114 | 06-01-2020 | Real Estate Tax Charge | 274.43 |
| 120 | 06-01-2020 | Operating Expense Charge | 699.25 |
| 120 | 06-01-2020 | Suite Rent Charge | 1,434.00 |
| 120 | 06-01-2020 | Real Estate Tax Charge | 308.45 |

| Suite | Due Date | Description | Amount |
|---|---|---|---|
| 100 | 06-01-2020 | Amortization Charge | 445.79 |
| 100 | 06-01-2020 | Amortization | 202.85 |
| 100 | 06-01-2020 | Operating Expense Charge | 2,911.89 |
| 100 | 06-01-2020 | Suite Rent Charge | 5,970.00 |
| 100 | 06-01-2020 | Real Estate Tax Charge | 1,276.13 |
| 114 | 06-01-2020 | Operating Expense Charge | 826.21 |
| 114 | 06-01-2020 | Suite Rent Charge | 1,284.00 |
| 114 | 06-01-2020 | Real Estate Tax Charge | 274.43 |
| 120 | 06-01-2020 | Operating Expense Charge | 699.25 |
| 120 | 06-01-2020 | Suite Rent Charge | 1,434.00 |
| 120 | 06-01-2020 | Real Estate Tax Charge | 308.45 |

801 — Acme, Inc.
555-555-1234 x137

Invoice Number #000009
Issue Date 2018-04-11
Due Date 2018-04-11

Bill to:
Marty McFly
200 Billing Rd.
Suite 100
Needham, MA 02494

Ship to:
Marty McFly
100 Shipping Rd.
Apt 200
Pleasantville, NC 12345

| PAID | $685.35 |

| Item | Quantity | Unit Price | Amount |
|---|---|---|---|
| 811 — Professional Plan¹ 04/11/2018 - 05/11/2018 | 1 | $99.00 | $99.00 |
| 803 — Small Instance (Hourly)¹ | 764 | $0.25 | $191.00 |
| 813 — Large Instance (Hourly)¹ | 943 | $0.50 | $471.50 |

Vector_LIR1 = RedHashedVector * 0.8 + GreenHashedVector * 0.2
Vector_LIR2 = OrangeHashedVector * 0.8 + GreenHashedVector * 0.2
Vector_LIR3 = YellowHashedVector * 0.8 + GreenHashedVector * 0.2

Acme, Inc.
555-555-1234 x137

Invoice Number   #000009
Issue Date       2018-04-11
Due Date         2018-04-11

Bill to:                Ship to:
Marty McFly             Marty McFly
200 Billing Rd.         100 Shipping Rd.
Suite 100               Apt 200
Needham, MA 02494       Pleasantville, NC 12345

| PAID | $685.35 |

| Item | Quantity | Unit Price | Amount |
|---|---|---|---|
| 811 — Professional Plan¹ 04/11/2018 - 05/11/2018 | 1 | $99.00 | $99.00 |
| 803 — Small Instance (Hourly)¹ | 764 | $0.25 | $191.00 |
| 813 — Large Instance (Hourly)¹ | 943 | $0.50 | $471.50 |

*Schema 1*

GL3
GL4

$p=0.88$

[GL4, GL3, GL3] =
0.88*(0.71+0.32+0.35) =
1.21 similarity scores

815:
Vector_LIR1 * Vector_GL1 = 0.03
Vector_LIR1 * Vector_GL2 = 0.06
Vector_LIR1 * Vector_GL3 = 0.02
Vector_LIR1 * Vector_GL4 = 0.71
Vector_LIR1 * Vector_GL5 = 0.01

817:
Vector_LIR2 * Vector_GL1 = 0.04
Vector_LIR2 * Vector_GL2 = 0.05
Vector_LIR2 * Vector_GL3 = 0.32
Vector_LIR2 * Vector_GL4 = 0.04
Vector_LIR2 * Vector_GL5 = 0.01

819:
Vector_LIR3 * Vector_GL1 = 0.05
Vector_LIR3 * Vector_GL2 = 0.07
Vector_LIR3 * Vector_GL3 = 0.35
Vector_LIR3 * Vector_GL4 = 0.06
Vector_LIR3 * Vector_GL5 = 0.03

| SDE Accuracy | | |
|---|---|---|
| # of Bills in (1, 9) | <= 10% Multi-GL Bills | > 10% Multi-GL Bills |
| Accountant Org | 63% | 38% |
| Non-Accountant | 71% | 45% |
| | | |
| # of Bills in (10,30) | <= 10% Multi-GL Bills | > 10% Multi-GL Bills |
| Accountant Org | 71% | 60% |
| Non-Accountant | 72% | 58% |
| | | |
| # of Bills in (31,100) | <= 10% Multi-GL Bills | > 10% Multi-GL Bills |
| Accountant Org | 79% | 68% |
| Non-Accountant | 77% | 68% |
| | | |
| # of Bills > 101 | <= 10% Multi-GL Bills | > 10% Multi-GL Bills |
| Accountant Org | 89% | 68% |
| Non-Accountant | 87% | 67% |
| | | |
| Org-Weighted | 69% | 51% |
| Bill-Weighted | 80% | 62% |

903

| SDE3_GL Accuracy | | |
|---|---|---|
| # of Bills in (1, 9) | <= 10% Multi-GL Bills | > 10% Multi-GL Bills |
| Accountant Org | 67% | 42% |
| Non-Accountant | 75% | 50% |
| | | |
| # of Bills in (10,30) | <= 10% Multi-GL Bills | > 10% Multi-GL Bills |
| Accountant Org | 77% | 67% |
| Non-Accountant | 76% | 70% |
| | | |
| # of Bills in (31,100) | <= 10% Multi-GL Bills | > 10% Multi-GL Bills |
| Accountant Org | 79% | 77% |
| Non-Accountant | 83% | 76% |
| | | |
| # of Bills > 101 | <= 10% Multi-GL Bills | > 10% Multi-GL Bills |
| Accountant Org | 92% | 82% |
| Non-Accountant | 89% | 76% |
| | | |
| Org-Weighted | 73% | 57% |
| Bill-Weighted | 83% | 72% |

*FIG. 9.*

TABLE INFORMATION EXTRACTION AND MAPPING TO OTHER DOCUMENTS

CROSS-REFERENCE TO RELATED APPLICATIONS

This application is a continuation of, and claims priority from, U.S. patent application Ser. No. 17/461,120, filed on Aug. 30, 2021, the contents of which are hereby incorporated by reference in its entirety.

BACKGROUND

Existing computer applications and models are configured to process natural language characters in documents (e.g., digital books, letters, etc.). For example, some technologies can use standard natural language processing (NLP) functionality in order to determine the semantic meaning of words in a natural language sentence of a document. However, these technologies, such as existing machine learning models, fail to adequately extract information from tables, such as invoice tables, and translate or map that information to other formats or documents, such as a bookkeeping document that tracks expenses. These existing technologies also require extensive manual user input and unnecessarily consume computer resources (e.g., memory and latency), among other things.

BRIEF SUMMARY

Particular embodiments of the present disclosure include a computer-implemented method, a non-transitory computer storage medium, and a system. Some aspects are directed to improving the accuracy of existing machine learning models, software technologies, and computer resource consumption by mapping data inside structural elements (e.g., rows) as found within a document to data objects of other documents (e.g., a set of historical bookkeeping documents), where the data objects are at least partially indicative of candidate categories that the data can belong to. Other advantages, embodiments, improvements and the like are described herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 5 is a schematic diagram of an example table that has been detected, according to some embodiments.

FIG. 6A is a schematic diagram illustrating that a table, without a visible lines defining the table, has been detected, according to some embodiments.

FIG. 6B is a schematic diagram illustrating the table of 6A, which has been parsed into columns, according to some embodiments.

FIG. 6C is a schematic diagram illustrating the table of 6B, which has been further parsed into records or rows, according to some embodiments.

FIG. 8B a schematic diagram that illustrates how similarity scores are derived using the values indicated in FIG. 8A, according to some embodiments.

FIG. 8C is a schematic diagram illustrating how the generated similarity scores are used to make final predictions for generating documents or document elements, according to some embodiments.

FIG. 9 is a schematic diagram illustrating accuracy results of particular embodiments relative to existing technologies, according to some embodiments.

DETAILED DESCRIPTION

Figure 1:
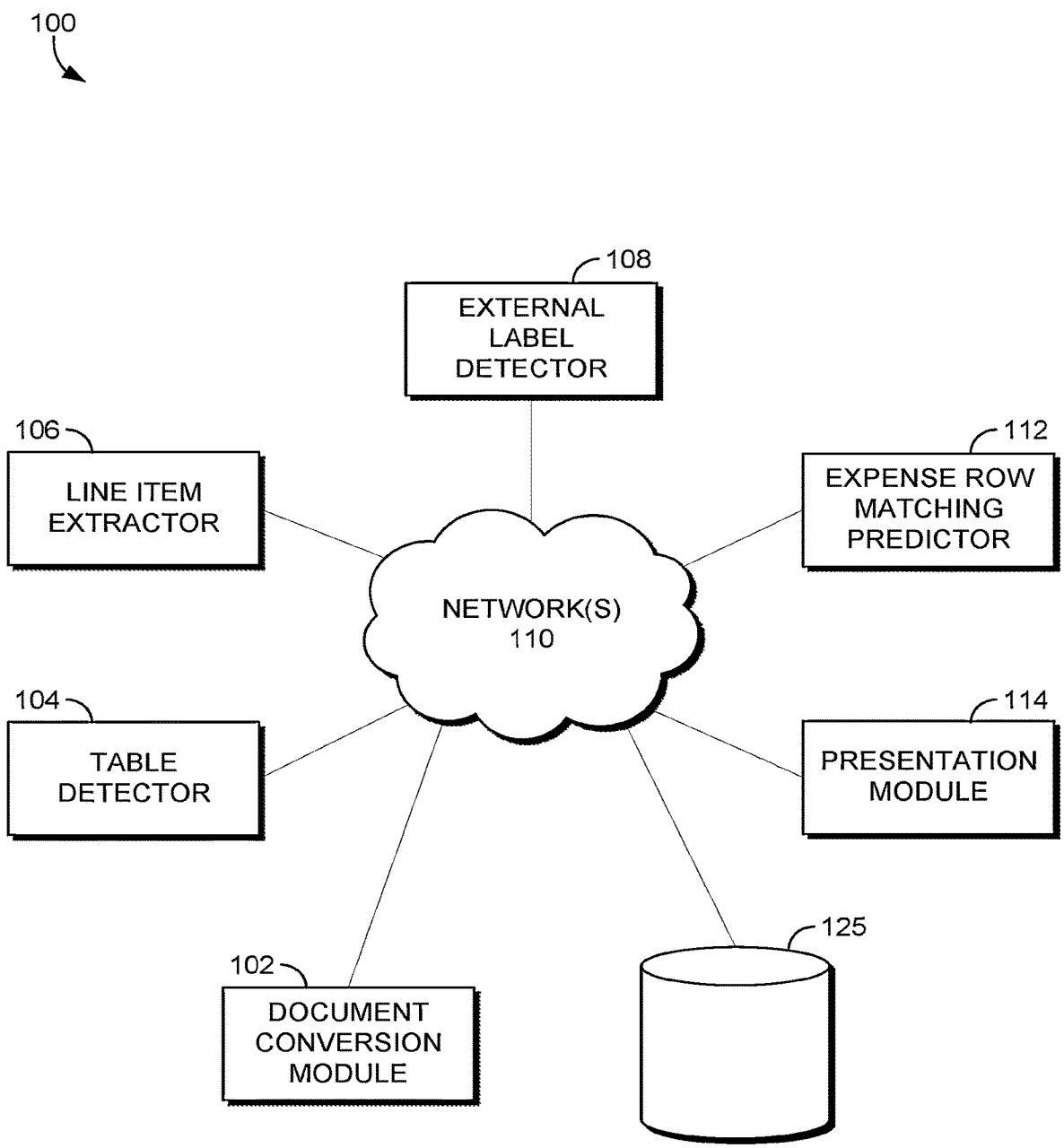
FIG. 1 is a block diagram of an illustrative system architecture, according to some embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Many entities require that every dollar of all expenditures be categorized accurately into the correct bookkeeping dimensions for the entities' expense tracking and financial reporting requirements. Various technologies assist users with these bookkeeping tasks. For instance, some computer applications contain user interface pages that categorically indicate bookkeeping identifiers (e.g., office furniture) and can receive manual user input so that the user can manually drag and manually add up data representing individual item expenses (e.g., an office chair and desk) into fields that represent the identifiers. Manually identifying the correct categories for every piece of information and manually adding numerical values is a time-consuming and human error-prone process. Although some existing technologies employ an auto-fill feature (e.g., Smart Data Entry (SDE)), this statically copies select bookkeeping dimensions from the last time a user uploaded an invoice from a same vendor. However, this technology ignores all information from an uploaded invoice regarding tables, fails to perform any image processing on tables, and fails to automatically perform operations on numerical values, such as adding values. This severely limits the functionality and accuracy of generating documents that reflect information inside individual tables.

Existing models also fail to accurately extract information from tables. For example, some machine learning models can process invoices by searching for any number that looks like a dollar amount (e.g., via matching dollar sign symbols) on all parts of a document and then these models add up the numbers regardless of the table structure that contain the numbers. But this can cause inaccuracies when aggregating or performing other numerical operations on the numbers. For example, existing models may try to add an invoice amount for a first item as located in a table with another different number (e.g., shipping total) outside of the table and associate them both with a bookkeeping record for the first item even though the different number outside of the table may not be related to the first item.

Although existing technologies (e.g., object detection models) can perform static functionality with regard to detecting objects, such as tables, they fail to extract or detect individual structural elements of the table itself, such as columns and rows. This causes calculations and predictions to be inaccurate for individual rows of a table. For example, without parsing tables into rows, these models fail to adequately associate individual numerical quantities ($124) with descriptions of items (e.g., an office chair) to determine that the item costs a particular amount of money. This failure to associate causes existing models to statically add or otherwise aggregate numbers associated with different categories, thereby causing inaccuracies.

Further, most existing table extraction technologies are configured to process tables in academic papers, books, and government reports, which are much easier to extract information from and do not require the subject matter expertise nor business constraints that are required for invoice line item table extraction. A line item table is a table that lists individual items and their expenses, such as "toner, $800" by row. These line item tables are inherently more unstructured and contain less natural language words than other tables and so performing typical NLP tasks, such as Stemming and Lemmatization, are likely to be unsuccessful. This is because these NLP tasks assume that there are enough words in the table to provide meaning. But these line item tables contain fewer words to process.

Existing technologies and computers themselves also consume an unnecessary amount of computing resources. For example, existing technologies are associated with increased latency and CPU utilization. This is because these technologies process each word in a document, even when such word is outside of a table to make predictions. For instance, particular technologies use graph neural networks that use annotations or labels at the word level, meaning that every word for every document is processed and represented as a node that must be traversed. Such traversal causes the CPU to be over-utilized and incur high computational costs because these traversals are multiplied by all the words in a document that must be processed. This also consequently increases the latency to execute operations.

Various embodiments of the present disclosure provide technical solutions to one or more of the technical problems described above, as well as other problems. In operation, particular embodiments are directed to mapping data inside structural elements (e.g., rows) as found within a document to data objects (e.g., an Expense Item Row (EIR)) of other documents (e.g., a set of historical bookkeeping documents), where the data objects are at least partially indicative of candidate categories that the data can belong to. For instance, particular embodiments can receive a first document (e.g., an invoice) associated with a user. Some embodiments can responsively determine a table (e.g., a line item table), such as by generating a set of bounding coordinates that define the table using one or more machine learning models. Particular embodiments can responsively extract various structural elements from the table, such as columns and/or rows from the table, as well as individual strings and numerical values (e.g., via object character recognition and computer vision functionality to locate lines on the table).

Some embodiments can responsively determine a similarity score between a first set of words and a data object (e.g., an EIR). The first set of words may be included in a first structural element (e.g., a row) of the various structural elements. The data object may at least partially indicate, at a second document associated with the user (e.g., a first bookkeeping document), a category that is a candidate for the first set of words to belong to. For instance, some embodiments generate feature vectors or hashes representing the first set of words and the data object and responsively determine a score or distance (e.g., a Euclidian or Cosine distance) between the two in order to determine whether the first set of words belongs to the candidate category. In an illustrative example, the first set of words may reference a line item description that includes the word "chair" and the data object may include a description that says "office furniture" or otherwise be associated with similar words in the past, such as "office," "desk," and "chair." Using hashing, NLP (e.g., WORD2VEC or Bidirectional Encoder Representation from Transformer (BERT)), or other machine learning functionality, embodiments can determine that the first set of words and data object are similar (e.g., semantically similar or have a similar dot product score within a threshold) and that both "office" and "chair" belong to the category of "office furniture."

Some embodiments further determine a second similarity score between a second set of words and the same data object. The second set of words may be included in a second structural element of the various structure elements. For example, in some embodiments the second set of words may reference another line item description that includes the word "desk" and, as described above, the data object may include a description that says "office furniture." Based on the first similarity score and the second similarity score meeting a threshold (e.g., the corresponding feature vectors being within a particular distance), particular embodiments aggregate the numerical values from the first structural element and the second structural element. For example, using the illustration above, a first row representing a line item for "chair" may have a cost value of $60 and a second row representing another line item for "desk" with a cost value of $120 may be summed to $180 and may be placed under an "office furniture" identifier in a newly generated document. In some embodiments, operations other than aggregation or addition may be employed, such as subtraction or multiplication, as described in more detail below.

Particular embodiments improve existing computer applications by automatically generating documents or elements based on new rules that these technologies currently do not employ. As described above, existing computer applications are configured to receive manual user input so that the user can manually drag and add up data representing individual item expenses (e.g., an office chair and desk) into fields that represent the identifiers. However, various embodiments do not require such manual user input but rather perform automated functionality, such as automatically determining a table, automatically extracting rows and/or columns, and/or automatically generating a document or other user interface element (or automatically populate fields) in order to map data objects with data located in the rows or columns. Such automated functionality is based on a new set of rules, such as aggregating numerical values (or otherwise performing an operation) from different structural elements only when (or based on) similarity scores meeting a threshold and/or only when columns or rows have been extracted from a document. Another example of new rules include how to define a table when there are or are no lines (e.g., if a table has no lines, generate a bounding box over the words). Accordingly, these automated embodiments are not as time-consuming and error-prone prone because users are more likely to make dragging or other user input errors. Some embodiments also improve existing technologies, such as SDE, because particular embodiments perform image processing on tables. This provides more robust functionality and accuracy of generating documents that reflect information inside individual tables.

Various embodiments also improve how existing computers and machine learning models detect objects, such as tables. Specifically, these embodiments are more accurate in extracting information from tables relative to existing models. This is because particular embodiments extract structural elements, such as rows and/or columns from a table. This helps embodiments both more accurately associate individual words and numerical values belonging to the same item, and more accurately make calculations for applying operations on numerical values (e.g., aggregating row values). For instance, particular embodiments determine that a numerical value expense belongs to a particular item (i.e., the item cost a certain dollar amount) based on these units of information being parsed into the same row. Without such parsing, making such associations are difficult for computers, as they may associate a numerical value with any nearby natural language string. Consequently, computers can then better associate or map the rows themselves to data objects that represent appropriate categories for the rows so that numerical operations, such as adding the corresponding values from different rows to the same category can occur.

Similarly, some embodiments mostly extract information and perform operations on numerical values inside the table, but not outside the table unless absolutely needed. Using the example above, unlike existing technologies that search for any number that looks like a dollar amount and then add an invoice amount for a first item as located in a table with an unrelated different number outside of the table, particular embodiments add or otherwise perform operations mainly inside a table and only reach outside of a table under certain conditions, as described in more detail below.

Various embodiments also improve the way computers and object detection technologies recognize tables because they train or fine-tune on line item tables. Line item tables are very unique in that they typically contain a brief description of an item (e.g., a good or service) and the cost for that item. These tables tend to be devoid of paragraphs, sentences, and free-flowing natural language characters, unlike other tables. Accordingly, for example, training on academic tables on any off-the-shelf NLP model that uses only stemming, lemmatization, POS tagging, etc., would likely be unsuccessful. Accordingly, particular embodiments train or fine-tune on line item tables so that models can learn (e.g., via specific labelling of columns, rows, and tables) the structure, word patterns, and the like.

Various embodiments also improve resource consumption relative to existing technologies and computers. For example, particular embodiments improve the latency and CPU utilization of computers. This is because particular embodiments do not process each word in a document, such as those words outside of a table to make predictions. For instance, instead of using a graph neural networks that use annotations or labels at the word level, particular embodiments make annotations or labels at a table, column, and/or row level, meaning that only words inside of the table are analyzed in various cases. Consequently, CPU is not over-utilized and there are lower computational costs, which also decreases the latency to execute operations.

FIG. 1 is a block diagram of an illustrative system architecture 100 in which some embodiments of the present technology may be employed. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the system 100 are distributed across a cloud computing system (e.g., the computer environment 1400 of FIG. 14). In other embodiments, the system 100 is located at a single host or computing device (e.g., the computing device 1500 of FIG. 15). In some embodiments, the system 100 illustrates executable program code such that all of the illustrated components and data structures are linked in preparation to be executed at run-time.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

The system 100 is generally directed to generating a document (or element of a document) that includes a data object that at least partially indicates a category and output numerical values from different rows of a different document, according to some embodiments. The system 100 includes a document conversion module 102, a table detector 104, a line item extractor 106, an external label detector 108, an expense row matching predictor 112, a presentation component 114, and storage 125, each of which are communicatively coupled to the network(s) 110. The network(s) 110 can be any suitable network, such as a Local Area Network (LAN), a Wide Area Network (WAN), the internet, or a combination of these, and/or include wired, wireless, or fiber optic connections. In general, network(s) 110 can represent any combination of connections (e.g., APIs or linkers) or protocols that will support communications between the components of the system 100.

The document conversion module 102 is generally responsible for converting (e.g., via PymuPDF) one or more raw documents into another format in preparation for further processing (e.g., by a machine learning model). For example, the document conversion module 102 may convert any document (e.g., a MICROSOFT WORD document) that is not an image into an image. A "document" as described herein refers to an entire object or set of pages that are associated with or belong to a particular event (e.g., a work job or series of tasks) or entity (e.g., a company). Each document, however, can have multiple pages. For example, invoice A (which has 5 pages) from Company B can be uploaded and invoice C (which has 10 pages) from company D can be uploaded. In this example, there are only two documents—invoice A and invoice C, even though both have multiple pages. In some embodiments, such document is a financial document such as an invoice, a bill, a balance sheet, an income statement, a tax document, a cash flow statement, or a statement of changes in equity.

Often, information is difficult to extract in certain formats and/or the original formats consume unnecessary computer memory resources. Accordingly, data may be converted from one format to another in order to extract all features of a document, save on memory resources, and the like all while maintaining high image quality. For example, the document conversion module 102 can automatically convert a PDF document of several pages into an image file output format (e.g., .jpg, .png, .bmp, .tiff, etc.), such as via a PDF-to-JPG converter. JPEG, for example, is a file format that can contain image with 4:1 to 10:1 lossy image compression technique via conversion. With this compression technique embodiments can reduce the image size of images contained within PDF documents without losing the image quality.

In some embodiments, the document conversion module 102 additionally or alternatively performs functionality by using an Extract Transform Load (ETL) functionality. ETL refers to the concept of pulling (or copying) data from one or more source databases (e.g., storage 125) and writing the pulled data into a target data store (e.g., a data warehouse). Specifically, for the "Extract" operation, data (e.g., raw data) is extracted or read from one or data sources (e.g., different types of databases). For the "Transform" operation, the read data is converted from its previous form (e.g., raw form) into the form it needs to be in so that it can be placed in another database. Transform occurs by using lookup tables, one or more rules, or combining the read data with other data. In an illustrative example of the Transform operation, several unrelated documents can be joined. In another example, the Transform operation can additionally or alternatively clean, sort, validate, and/or prepare the read data. For the "Load" operation, the transformed data from the "Transform" operation is then written into a target data store. For example, using the illustration above, the joined documents can be output in a single view.

Alternatively or additionally, the document conversion module 102 performs functionality by performing machine learning pre-processing steps on one or more documents, such as data wrangling, data munging, scaling, and the like. Data wrangling and data munging refers to the process of transforming and mapping data from one form (e.g., "raw") into another format with to make it more appropriate and useable for downstream processes (e.g., predictions). Scaling (or "feature scaling") is the process of changing number values (e.g., via normalization or standardization) so that a model can better process information. For example, the document conversion module 102 can bind number values between 0 and 1 via normalization. In some embodiments, the output of the document conversion module 102 is an image of a document with a fixed crop ration, pixel per inch (PPi).

The table detector 104 is generally responsible for determining a table in a document. Such determination may include a classification of the type of table (e.g., a line item table) and/or the bounding box coordinates of the table. In some embodiments, the table detector 104 performs its functionality in response to the document conversion module 102 performing its functionality.

Some embodiments cause presentation, on a document, of an indication of the prediction and/or a spatial location within the document where the predicted table is derived from. For example, some embodiments use a computer vision-based machine learning model (e.g., a Convolutional Neural Network (CNN)) to detect a table in a document via a bounding box. A bounding box describes or defines the boundaries of an object (e.g., a table) in terms of the position (e.g., 2-D or 3-D coordinates) of the bounding box (and also the height and width of the bounding box). Bounding boxes thus define the boundaries and encompasses a computer object representing a table object of a document. For example, the bounding box can be a rectangular box that is determined by its X and Y axis coordinates, which is formulated over a table. In this way, for example, a bounding box can be generated or superimposed over a table that includes the numerical value of $13,500 and natural language indicia reading "total invoice value." Bounding boxes gives object recognition systems indicators of the spatial distinction between objects to help detect the objects in documents.

In some embodiments, one or more machine learning models can be used and trained to generate tighter bounding boxes for each object. In this way, bounding boxes can change in shape and confidence levels for classification/prediction and can be increased based on increased training sessions. For example, the output of a CNN or any other machine learning model described herein can be one or more bounding boxes over each line item table of an image, where each bounding box includes the classification prediction (e.g., this object is a line item table) and the confidence level (e.g., 90% probability).

In various embodiments, the table detector 104 classifies or otherwise predicts whether each table in each document belong to certain classes or categories (e.g., the object detected is a line item table). These predictions or target classifications may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem.

In some embodiments, the table detector 104 performs its functionality based on training one or more machine learning models to recognize the type of table needed, such as a line item table. For instance, ground truth line item tables can be used in training, where the tables themselves, the headers, rows, and/or columns can be labeled. For instance, tables can be labeled as line item tables, and columns of a line item table can be labeled as "description" columns, indicative of a header. Description columns describe the item and/or service for which an expense is due. In another example, columns of a line item table can be labeled as "amount," which describes, typically in numerical characters, the specific amount due for the corresponding item. In yet another example, columns of a line item table can be labeled as "quantity," which typically describes the quantity of the item described in the "description" column that has been purchased. Each of these columns are indicative of a table being a line item table. In this way, the models that the table detector 104 uses can learn that these features are indicative of line item tables after optimizing a loss function (e.g., a Faster-RCNN loss function) over various training epochs. In some embodiments, the table detector 104 uses other non-line-item tables to train on in order to distinguish between tables. In some embodiments, the detected table need not be a line item table, but any suitable table that has any characters or numbers inside the table (e.g., as indicated in a spreadsheet).

In some embodiments, the bounding box coordinates themselves or specific tables can be learned based on the location of tables in training data, the dimensions of tables in the training data, and the like. For example, for a first entity or vendor, if a line item table is always located at the bottom right part of a document, the models can learn this position such that at a future time for the first entity, if another table is located in the same position, it can be predicted with high confidence that the table is a line item table. Additional functionality for detecting tables is described in more detail below.

In some embodiments, the table detector 104 performs (or calls and obtains from a service) object character recognition (OCR) functionality on characters located in the detected table (and/or document that includes the table). This is because, as described above, words or numbers inside of the table themselves are indicative of particular table classifications (e.g., "amount" and "description" are indicative of line item tables) and/or are used for further downstream processes, such as adding numbers and generating similarity scores. OCR detects natural language characters and coverts such characters into a machine-readable format (e.g., so that it can be processed via a machine learning model). In an illustrative example, an OCR component can perform image quality functionality to change the appearance of the document by converting a color document to greyscale, performing desaturation (removing color), changing brightness, and changing contrast for contrast correctness, and the like. Responsively, the OCR component can perform a computer process of rotating the document image to a uniform orientation, which is referred to as "deskewing" the image. From time to time, user-uploaded documents are slightly rotated or flipped in either vertical or horizontal planes and in various degrees, such as 45, 90, and the like. Accordingly, some embodiments deskew the image to change the orientation of the image for uniform orientation (e.g., a straight-edged profile or landscape orientation). In some embodiments, in response to the deskew operation, some embodiments remove background noise (e.g., via Gaussian and/or Fourier transformation). In many instances, when a document is uploaded, such as through scanning or taking a picture from a camera, it is common for resulting images to contain unnecessary dots or other marks due to the malfunction of printers. In order to be isolated from the distractions of this meaningless noise, some embodiments clean the images by removing these marks. In response to the removing the background noise, some embodiments extract the characters from the document image and place the extracted characters in another format, such as JSON. Formats, such as JSON, can be used as input for other machine learning models, such as Convolutional Neural Networks (CNN) for object detection and/or NLP models for language predictions, as described in more detail below.

The line item extractor 106 is generally responsible for extracting structural elements (e.g., rows and columns) from the table detected by the table detector 104. For instance, in some embodiments, a structural element is a Line Item Row (LIR) which is a row that at least describes, in natural language, an item (e.g., a service or good) and the cost incurred for such item. LIRs can include other information, such as quantity, as described in more detail below. The table detector 104 can thus call the line item extractor 106 after it performs its functionality for further processing. In some embodiments, the line item extractor 106 calls at least one of four different functions or steps to perform its functionality. For example, the line item extractor 106 can obtain OCR results, detect all the columns of the table, detect all of the rows in the table, and/or format the final output. In an illustrative example, the line item extractor 106 can use computer-vision functionality to detect the lines (and/or white spaces) that makeup the columns or rows and generate corresponding bounding boxes or other logical markers over such structures. Such logical markers allows models to specifically parse the table image into its logical components for better downstream accuracy (e.g., the expense row matching predictor 112). For example, if a first row has a description of "eye glass cleaner" $15 and a second row has a description of "sunglasses" $130, then models are better able to associate the descriptions of both rows to the amounts in order to aggregate them under a common data object and total, such as "eyewear $145" (which is indicative that both rows belong to the same category and both costs should be combined). Without such row parsing, models may not be able to associate items and costs with each other. For instance, computers may not be able to determine that the $130 is what the sunglasses costs. Certain embodiments of the line item extractor 106 are described in more detail below.

The external label detector 108 is generally responsible for extracting keywords and/or corresponding numerical values outside of the table detected by the table detector 104. Such keywords or numerical values may be within the same document as the detected table but not inside the table itself. Such functionality can be used to generate additional data objects, apply operations on numerical values, and/or check whether numerical values are aggregated accurately. For example, the external label detector 108 may read a data structure of pre-stored key words to search for, such as "tax," "shipping," and "discount" amounts outside of the table. In some embodiments, the numerical values associated with "tax," "shipping," and "discount" may be supplemental information outside of a table to account for and which may modify aggregated numbers under a data object in a generated document (generated by the expense row matching predictor 112). For example, a categorical identifier of "total cost" (which takes into account all costs, regardless of the particular line items in a table) may include shipping costs. Accordingly, the expense row matching predictor 112 can use the amount under the shipping identifier to aggregate to the total lost category. In another example, the expense row matching predictor 112 can determine that "shipping" does not exceed a similarity score with any identifier describing a category and may thus generate a new category identifier of "shipping," with its corresponding value.

The expense row matching predictor 112 is generally responsible for making one or more final predictions on the N rows found in the table detected by the table detector 104 in order to generate a new document (or element of a document). The expense row matching predictor 112 can make such prediction by first determining similarity scores between one or more sets of words detected in one or more rows (or other structural element) of the detected table and one or more data objects that at least partially represent categories that are candidates for the words to belong to or are mapped to. A "data object" as described herein refers to any N-dimensional object and/or dataset, such as a table, record, a row, a field, and/or any other piece of information and/or data structure. For example, a data object can be or include a natural language description identifier that describes the candidate category, the name of a vendor, and/or numerical values. Although data objects can be N-dimensional from a programming perspective, from a user perspective and on a display screen, in some embodiments they may appear one-dimensional, such as a displayed identifier that describes a candidate category for expense items to belong to.

In some embodiments, such data object is an Expense Item Row (EIR). An EIR is a N×N (e.g., 3) table, where the user can have a non-negative number of rows and at least three columns—a GL Account, a Description, and Amount. A GL account refers to or is indicative of a particular category that particular items may belong to (e.g., books, electronic equipment, sports, etc.). Description is a free-form field that users input and that typically do not match LIRs found on a document. EIR descriptions tend to be diverse between different entities. In some embodiments, amounts of EIRs are restricted to nonzero floats with two decimal places. The Amounts are indicative of the costs incurred for items indicated in the GL account. In some embodiments, an EIR is an SDE data object that further includes an account ID (e.g., vendor ID), a department identifier, a location (e.g., address or coordinates) identifier, a class identifier, and a job identifier.

In some embodiments, such data objects are determined from other bookkeeping documents or historical information about a user. In other words, in some embodiments, the data objects representing categories are predefined or determined before a particular document that includes the detected table is processed. For example, the documents may be historical bookkeeping documents that indicate past data object identifiers the user has utilized, such as "food," "tools," "lawn care equipment," and the like to categorize individual item expenses. Accordingly, particular embodiments can generate similarity scores between these data objects and individual words in particular rows, such as "cupcake," "wrench," and "lawnmower."

In some embodiments, the expense row matching predictor 112 utilizes natural language processing (NLP) models (e.g., BERT or WORD2VEC) or hashed vectors (described in more detail below) to generate these similarity scores. For example, such models can encode each word in a row (a first feature vector) and data object (a second feature vector) into separate feature vectors and the distance between the two feature vectors reflects the semantic similarity between the two feature vectors. The higher the semantic similarity, the higher the similarity score.

NLP determines semantic relationships among different words, which includes determining what words have a same or similar (e.g., within a threshold distance when the words represent vectors) meaning, even if they are syntactically different. This is to say, semantic similarity between words on a document page can be determined even if they are syntactically different. "Syntax" or syntactic properties refers to the structure of character sequences of the content (as opposed to the semantics or meaning), such as the structure of a sentence. For example, "car" and "far" are syntactically similar but have two different definitions so they are not semantically similar. Rather, "far" and "distant" are semantically similar because they mean the same thing, even though they are structurally or syntactically different.

In some embodiments NLP tokenizes text on pages into their constituent words, numbers, symbols, and some or each of the words are tagged with a part-of-speech (POS) identifier. "Tokenization" or parsing in various embodiments corresponds to a computer-implemented process that segments the content into words, sentences, symbols, character sequence, and/or other elements of the content. This can include a set of rules for analyzing a message, such as word and/or part of speech (POS) order. For example, for the sentence "the girl jumped happily", the syntax may correspond to a word order where the structure is subject-verb-adverb (or subject, verb, object, etc.). In various embodiments, each word of a page is tagged with identifiers, such POS identifiers.

In some embodiments, NLP derives semantic and syntactic content of semi-structured or unstructured data (e.g., data in image files). This is in contrast to analyzing "structured" data, such as data in a database. NLP can be configured to parse content to determine semantic context (e.g., the meaning of words by analyzing each word in a page against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify which words of a table structural element belongs to which categorical identifier. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments, NLP includes functionality, such as Named Entity Recognition (NER). NER is an information extraction technique that identifies and classifies elements or "entities" in natural language text into predefined categories. Such predefined categories may be indicated in corresponding tags or labels. Entities can be, for example, names of people, specific organizations, specific locations, specific times, specific quantities, specific monetary price values, specific percentages, specific pages, and the like. Likewise, the corresponding tags or labels can be specific people, organizations, location," time, price (or other invoice data) and the like. In this context of the present disclosure, for example, these tags or labels can indicate whether certain extracted attributes correspond to a "price" of an item, the name of an entity (e.g., a particular corporation), line item information (e.g., description of service or item billed), address of an entity, the particular date listed on the page, or total amount due on an invoice.

In some embodiments, the expense row matching predictor 112 includes a pre-training component responsible for training one or more machine learning models to understand natural language words and the context (e.g., other words and numbers) typically associated with those words. For example, in some embodiments, the pre-training component trains on two unsupervised tasks simultaneously, such as masked language modeling (MLM) and next sentence prediction (NSP), such as in BERT models.

In some embodiments, the pre-training component additionally or alternatively uses word embeddings to generate similarity scores. In this way, different words or other characters in pages of documents can be converted into feature vectors and embedded in feature space based on how semantically similar (e.g., via cosine or Euclidian distance) each word or other character sequence is to each other. In various embodiments, such word embeddings are produced by variations of BERT, WORD2VEC, GloVe, and/or any other suitable word embedding models.

A "word embedding" or "embedding" as described herein includes vectors in feature space (e.g., also known as vector space or linear space) based on a contextual (e.g., semantic) similarity, feature similarity, and/or other similarity. In some embodiments, two or more vectors that are semantically similar (e.g., have the same or similar meaning) may be mapped or embedded near each other in vector space regardless of the syntactic similarity (e.g., similarity between word structure or appearance). Through this semantic relationship functionality, computers can understand how similar words (or extracted attributes of words) are to each other and/or how similar they are to other words (e.g., via cosine distance).

A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features. In other words, vectors are computer-readable. In some embodiments, the pre-training component processes or embeds feature vectors in feature space based on training one or more machine learning models.

In some embodiments, the expense row matching predictor 112 additionally performs operations on numerical values, such as adding multiple numerical values indicated in multiple rows of the detected table based on the similarity score being within a particular threshold. For example, using the illustration above, based on the word "wrench" ($20) in one row and "pliers" ($10) in another row of the detected table being semantically similar (e.g., to a data object or to each other) within a particular distance (e.g., a Euclidian distance), the expense row matching predictor 112 can add up the corresponding numerical values—20 and 10—to arrive at a final "tools" total value of $30.

In some embodiments, the expense row matching predictor 112 additionally generates one or more new documents (or elements (e.g., a data object) of a document), or populates fields on an existing document based on applying operations on the numerical values and the similarity score (s) exceeding the threshold. In other words, for example, the expense row matching predictor 112 can associate or map individual words of a given structural element with a particular data object for which they belong based on the similarity score and then responsively aggregate the corresponding values, which is then output in a different format. For example, using the illustration above, the expense row matching predictor 112 can automatically generate a new bookkeeping document that includes various data objects with aggregated numerical amounts. For example, one of the data objects may be "tools," and under this identifier may be a summation of the wrench and plier dollar values—$30. The document may include other data objects, such as "food," and "lawn care equipment" and corresponding aggregated values based on individual line item information located in the detected table.

The presentation module 114 is generally responsible for causing presentation of content and related information to user devices, such as an indicator or bounding box indicating a detected table or other user interface elements. The presentation module 114 may comprise one or more applications or services on a user device, across multiple user devices, or in the cloud. For example, in one embodiment, presentation module 114 manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation module 114 generates (or causes generation of) user interface features or elements. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. The presentation module 114 can additionally present the documents or document elements generated by the expense row matching predictor 112, such as causing display of a new bookkeeping document with data objects and aggregated values.

The storage 125 (e.g., a database, RAM, cache, persistent storage, etc.) can include documents, different training data (e.g., labeled documents or tables) that have been used to train deep neural networks or other machine learning models, as described in more detail below. Additionally or alternatively, storage 125 can include the maps, data structures, or routines needed by the components of the system 100.

Figure 2:
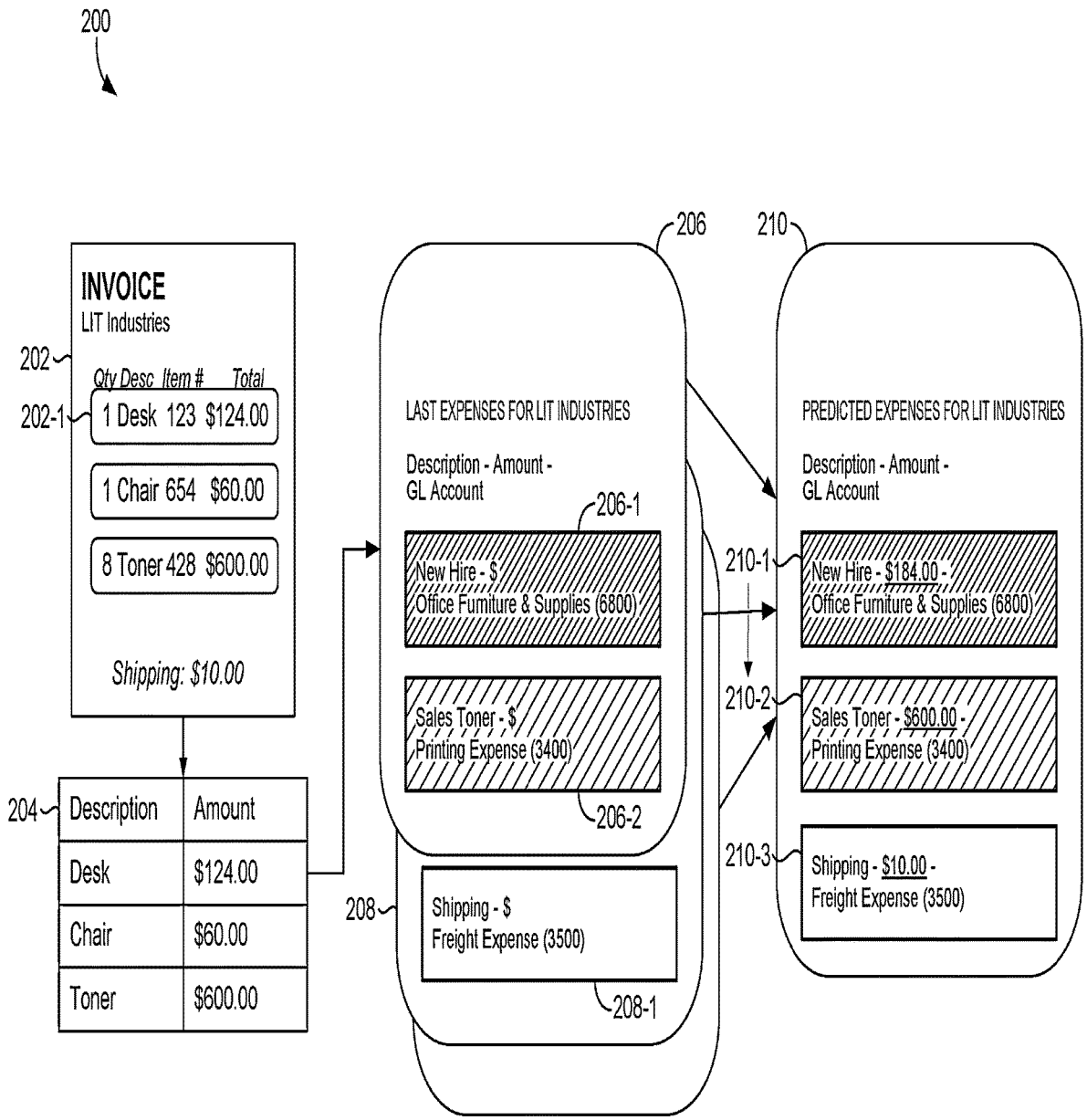
FIG. 2 is a schematic diagram illustrating how new bookkeeping documents (or data objects) are generated, according to some embodiments.

FIG. 2 is a schematic diagram illustrating how new bookkeeping documents 210 (or data objects) are generated, according to some embodiments. At a first time, the invoice document 202 is processed (e.g., by the table detector 104, the line item extractor 106, and/or the external label 108), which represents item expenses incurred by LIT Industries. An output of processing the invoice document 202 is the table 204. The table 204 indicates the table as illustrated in the invoice 202, except the table 204 is parsed into rows and columns and new headers for the columns are generated. Particular embodiments, such as the line item extractor 106, can map or associate particular headers located in the invoice document 202 to headers used in the output table 204. For example, using NLP or lookup data structure, the line item extractor 106 can map the word "Desc" as located in the invoice to "description," as indicated in the output table 204. The line item extractor 106 can further map the word "total," as indicated in the invoice document 202 to the word "amount," as indicated in the output table 204. In some embodiments, the words "total" and "amount" correspond to the "description" and "amount" columns, as described herein. As illustrated in FIG. 2, in some embodiments the output table 204 does not translate or copy other information within the invoice document 202 to the output table 204. For example, the "Qty" values are not copied to the output document 204 and the "shipping" values are not copied to the output table 204 (even though the shipping values are used further downstream, as described in more detail below).

In response to generating the output table 204, particular embodiments map or otherwise determine similarity scores between each word of each row under the "description" column of the output table 204 and various data objects (e.g., 206-1) of various historical bookkeeping documents (denoted by 206 and 208). Such historical bookkeeping documents may represent an N number of past bookkeeping documents that a given user or entity (LIT Industries in this case) has used. Some or each of these past bookkeeping documents may be unique or different because entities may have spent money on different items at different transactions or times. This is illustrated, for example, by the bookkeeping document 206 and bookkeeping document 208. For the bookkeeping document 206, LIT Industries only incurred expenses for office furniture and printing expenses, as indicated by the data objects 206-1 and 206-2. However, for the bookkeeping document 208, LIT industries may have additionally incurred shipping or "freight expenses," as illustrated by the data object 208-1. In various embodiments, each of the data objects 206-1, 206-2, and 208-1 include identifiers that represent categories that are candidates for which words located under the "description" column of the table 204 belong to, as In some embodiments, at least partially in response to calculating the similarity scores (e.g., by the expense row matching predictor 112) between the words under the "description" column of the table 204 and the data objects 206-1, 206-2, and 208-1, particular embodiments generate the document 210 (or individual elements, such as 210-1) based on the similarity score meeting a threshold. For example, as illustrated in FIG. 2, because the words (or feature vectors) of "desk" and "chair" are close in distance to the "Office Furniture & Supplies" data object 206-1, the expense row matching predictor 112 can map or copy the data object 206-1 (and surrounding information, such as "New Hire") from the document 206 to the document 210, which is identically represented as identifier 210-1. As illustrated in FIG. 2, this process is repeated for the "printing expense" identifier 206-2, which is mapped or copied from the document 206 to the document 210 and represented as 210-2. This can occur because the word "toner" as indicated in the output table 204 is close in distance or semantically similar to "printing expense."

FIG. 2 also illustrates that a document, such as document 210, can combine information from various different documents, such as 208 and 206. For example, the document 206 may not include a "freight expense" data object. However, the document 208 may include the "freight expense" data object 208-1. Accordingly, embodiments, such as the expense row matching predictor 112 can use a history of various documents for predictions, instead of just a single document. For instance, as illustrated in the invoice 202, there is a shipping cost of $10.00. Although similarity scores between "shipping" and the data objects 206-1 and 206-2 may be low or outside of a distance or other similarity score threshold (meaning that the document 206 does not contain a suitable data object for generating an output at the document 210), the similarity score between "shipping" and the "freight expense" data object 208-1 of document 208 may be within the threshold distance or otherwise meet a similarity score threshold. Accordingly, particular embodiments map or copy the data object 208-1 from the document 208 to the document 210, which is identically illustrated as 210-3. In this way, the document 210 in some instances is a combination of multiple historical documents and may not reflect any one single historical document. Thus the document 210 can combine multiple documents.

In some embodiments, at least partially in response to calculating the similarity scores (e.g., by the expense row matching predictor 112) between the words under the "description" column of the table 204 and the data objects 206-1, 206-2, and 208-1, particular embodiments add numerical values from the table 204 based on the similarity score meeting a threshold. For example, the document 210 indicates the aggregated numerical value of "$184.00," which represents a summation value between the "Desk" value—"$124.00"—and the "Chair" value—"$60.00" (124+60=184). In other words, for example, because both "desk" and "chair" are semantically similar or belong to the "Office Furniture & Supplies" data object 206-1 (and/or because they are semantically similar to each other), both of the corresponding "desk" and "chair" numerical values are added up and placed at the data object 210-1 in the document 210. This process is repeated for the "toner" value—$600— and the "shipping" value—$10 of the table 204, though these are isolated values that are not aggregated or added to other values since there are no other words or items that fit these data object categories.

Figure 3:
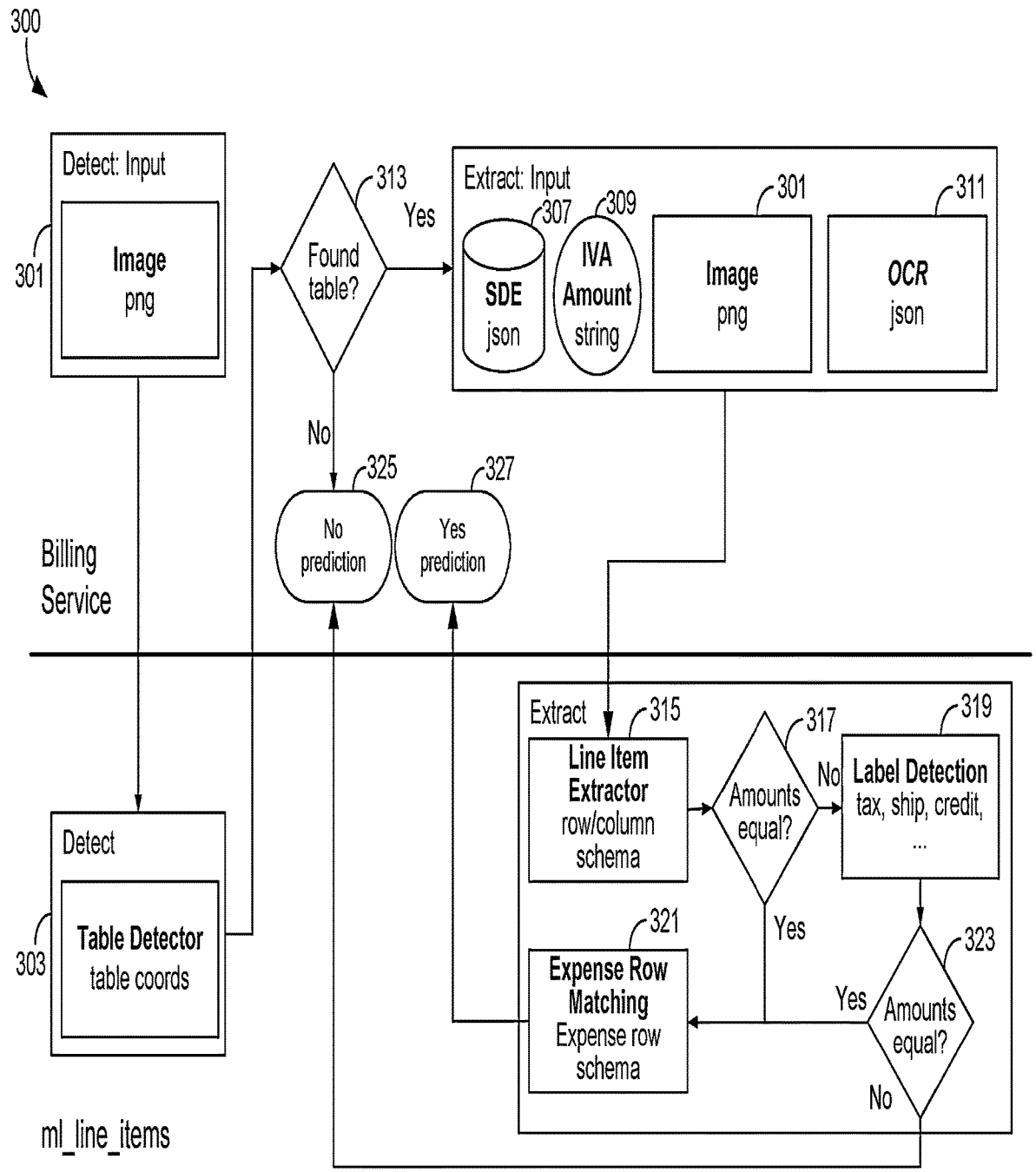
FIG. 3 is a block diagram of an example system flow, according to some embodiments.

FIG. 3 is a block diagram of an example system flow 300, according to some embodiments. In some embodiments, the system flow 300 represents the steps that components of the system 100 preform. FIG. 3 illustrates the relationships between the inputs and the output. The system flow 300 further illustrates a main algorithm used for these embodiments (Detect and Extract) in which the billing service 305 handles the order of calls by packaging different payloads and using the "algorithm" keyword in the payload.

One of the inputs into the system flow 300 is an image 301, which may represent an image of an invoice document that has been converted by the document conversion module 102. The input image 301 can be in any suitable format (e.g., png, pdf, jpg). In some embodiments, additional inputs include OCR 311, the predicted amount from the intelligent virtual assistant (IVA) 309, and the user's past historical bookkeeping documents 307 (e.g., SDE). In some embodiments, the predicted amount from the IVA 309 is a predicted summation or other aggregation of values of a single document. For example, referring back to FIG. 2, the predicted amount from the IVA 309 for the invoice document 202 may be $794 (124+60+600+10), which is an aggregation of all line item numerical values and shipping costs (i.e., all costs within the document 202). In some embodiments, the past historical bookkeeping documents 307 include the bookkeeping documents 206 and 208 of FIG. 2.

The algorithm begins with the Detect computation 303 (e.g., as performed by the table detector 104), predicting the bounding box that encompasses the words that collectively define the table. In parallel, the billing service 305 calls the predicted IVA amount 309 and SDE values 307. In some embodiments, the table detector model uses a predefined threshold where confidence values greater than this threshold will be kept and values less than the threshold will be discarded. In the case of a table is found per 313 (or specific tables, such as line item tables), in some embodiments the return result will have a corresponding True Boolean entry signaling the billing service 305 to continue with the computation. Otherwise the Boolean may be False signaling no prediction 325 and bypassing any unnecessary computation (e.g., because no line item table was detected, even though other tables were detected). Continuing with the table found case, the billing service 305 will package the predicted table region, SDE 307, predicted IVA amount 309, image 301, and OCR and call the Extract computation (e.g., the line item extractor 106).

The Extract computation begins with the Line Item Extractor 315 (e.g., the line item extractor 106), which uses the OCR 311 enclosed by the predicted table region. Using the OCR word values and spatial positions, the line item extractor 315 produces the associations of Rows and Columns. Similar to Table Detector 303, in some embodiments, the Line Item Extractor 315 has a set of criteria that is to be met to further pass its predictions. In some embodiments, such criteria includes the sum of line item rows (LIR) numerical values matching the predicted IVA amount 309, as indicated by the "amounts equal" indicia 317. This functionality accounts for any expenses that may be located outside of the detected table, such as shipping. In an illustrative example, referring back to FIG. 2, the line item extractor 315 may summarize the table in the invoice document 202 to be $784 (124+60+600), which doesn't account for the $10 dollars shipping and is different than the IVA amount string 309 value of $794.

If there is no match, as indicated in this example above, then Label Detection 319 (e.g., the external label detector 108) will run to find value amounts (tax, shipping, credits) outside of the table and compare again per 323. If the amounts are equal, then the Expense Row Matching 321 (e.g., the expense row matching predictor 112) takes the predictions with the historical expense entries from the user and groups and/or divides each extracted row (e.g., the row 202-1 of FIG. 2) to the appropriate EIR or data object (e.g., the "Office Furniture & Supplies" identifier 210-1), as well as aggregate or separate the corresponding numerical values to make the prediction 327. This result and intermediate results are packed together and sent back for entry and display to the user.

Figure 4:
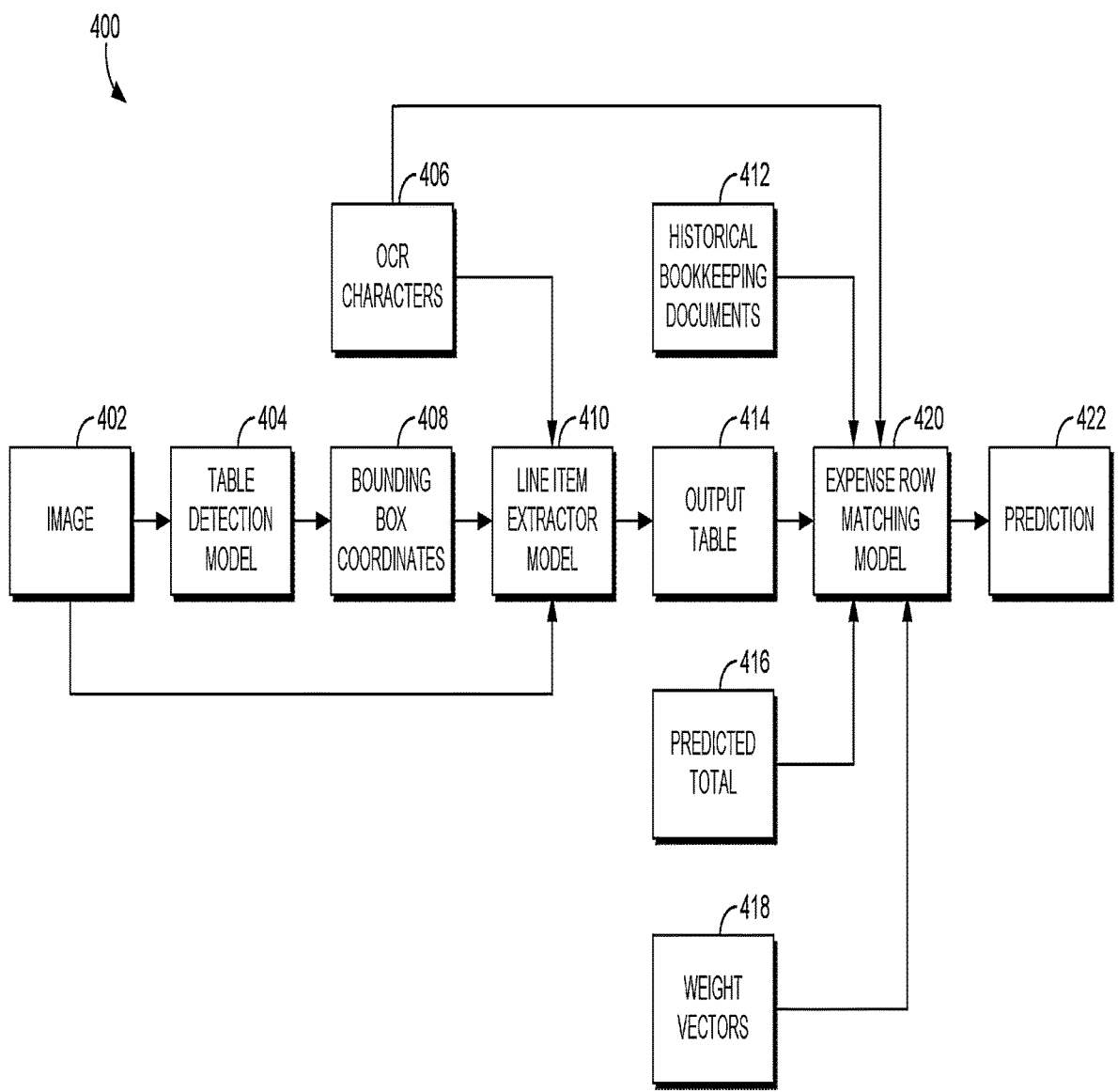
FIG. 4 is a block diagram illustrating various particular models and inputs/outputs for such models in order to make one or more predictions, according to some embodiments.

FIG. 4 is a block diagram illustrating various particular models and inputs/outputs for such models in order to make one or more predictions, according to some embodiments. The input to the table detection model 404 is the image 402. In some embodiments, the table detection model 404 represents the table detector 104 of FIG. 1 and/or the table detector 303 of FIG. 3. In some embodiments, the image 402 represents the image 303 of FIG. 3 or document, such as an invoice. The table detection model 404 detects a table, such as a line item table, and responsively produces the output 408, which is a set of bounding box coordinates that define or encompass the detected table.

The line item extractor model 410 produces or generates a new output table 414 with rows and/or columns using, as inputs, the OCR characters 406 and the bounding box coordinates 408, and the image 402. In some embodiments, the output table 414 represents the output table 204 of FIG. 2. In some embodiments, the line item extractor model 410 represents the functionality described with respect to the line item extractor 106 of FIG. 1 and/or the line item extractor 315 of FIG. 3. In some embodiments, the OCR characters 406 represents the OCR 311 of FIG. 3 and/or the parsed characters performed by the table detector 104 of FIG. 1. For example, the OCR characters 406 can represent each word and numerical value located in the invoice document 202 of FIG. 2 that have been parsed and extracted via an OCR component.

The expense row matching model 420 takes, as input, the OCR characters 406, the output table 414, the predicted total 416, and the weight vectors 418, in order to make a final prediction 422 or inference. In some embodiments, the expense row matching model 420 represents the expense row matching predictor 112 and/or the expense row matching 321 of FIG. 3. In some embodiments, the historical bookkeeping documents 412 represent the set of documents 206 and 208 of FIG. 2 and/or the SDE 307 of FIG. 3. In some embodiments, the predicted total represents the IVA amount string 309 of FIG. 3. In some embodiments, the weight vectors 418 represent weigh values that are used for generating similarity scores, as described in more detail below. In some embodiments, the prediction 422 includes generated similarity scores, the applying of the appropriate operations (e.g., adding values of different rows), and/or generated documents or elements, as illustrated by the document 210 of FIG. 2.

FIG. 5 is a schematic diagram of an example table that has been detected, according to some embodiments. In some embodiments, FIG. 5 represents the output performed by the table detector 104 of FIG. 1, the table detector 303 of FIG. 3, or the table detection model of FIG. 4. In some embodiments, the first algorithm in the pipeline is the spatial identification of a table, such as the table 500, in a document. As illustrated in FIG. 5, embodiments can detect the table 500 by encompassing the table 500 with a bounding box 502 and detecting a "description" column, as well as a "charges" column 508, which is semantically similar to an "amount" column. Accordingly, the probability that the table 500, for example, is a table or line item table is 100%, as illustrated by the indicia 504.

Various embodiments use one or more deep learning models to perform table detection. Deep learning models reduce computation time relative to hand-coding detection models, with some models being able to run in real time. Various embodiments may utilize any suitable architecture for object detection such as You Only Look Once (YOLO) models, Single Shot Detector (SSD), Region-based Convolutional Neural Networks, (R-CNN), and the like. For example, some embodiments us a Faster-RCNN network. Faster-RCNNs are flexible enough to accommodate the rules and requirements described herein. Moreover, the architecture has been extensively tested and several libraries have it as a default architecture.

Regarding Faster-RCNN architecture, it begins with taking the image, an array of depth 3 (RGB channels) and width and height of the image, and is convoluted several times. Thus reducing the image and height dimensions in favor for increasing the channel dimension. This transformed array is the learned features representation of the image. At this point, every pixel is tasked to produce a region proposal (bounding box prediction). This is called the Region Proposal Network (RPN) and is further supplemented with each pixel having priors of possible box predictions. The RPN is tasked to delineate objects of interest (Boolean). The objects that are selected by the RPN are pooled together and passed to the final layers of the neural network where the predictions of the class label and coordinates are generated. The loss function is the sum of the RPN, class classifier (cross entropy) and box regression (MSE or L1).

Various embodiments us any suitable library that allows for quick prototyping/testing. With this consideration, various embodiments implement the mmdetection framework. This library, written in pytorch, allows to easily swap out components of the architecture. Furthermore, it easily allows change of the backbone thereby lending itself to transfer learning. It is written to take advantage of parallel gpu training if needed and can perform inference in cpu or gpu. Lastly, it can easily incorporate the image augmentation library called Albumentations.

Various embodiments use the following parameters for the object detection model: Faster RCNN, +FPN (4 stages), Cross Entropy+SmoothL1 Loss, 550×400 RGB Image, ResNet 101 Backbone (Transfer Learning), SGD lr=0.02 momentum=0.9 weight decay=0.0001, Learning Rate Scheduler, Linear 500 iteration warmup, Reduction on 10 epochs and another at 18, Augmentations, Normalize (ImageNet values), Horizontal Flip, Shift Image, Hue Saturation, Random Brightness Contrast, RGB Shift, Blurr, Gaussian Noise, and Image Compression.

Various embodiments train machine learning model(s) for table detection. Some embodiments us the iMerit annotations with re-qc (iMerit re-annotated several documents). In some embodiments, The data included 32,152 annotated iMerit documents in total, with 662 annotated documents left for validation to facilitate comparisons with previous small sub-models that used 80/20 splits during the model exploration phase. Additionally, in some embodiments, the annotations were split by vendor or entity to minimize seepage across documents in the training and validation datasets.

Various embodiments train on line item tables, where "description" and "amount" columns are labeled. Various embodiments learn to detect line item tables based on these features, as opposed to other tables (e.g., table 510), that show customer name, for example. Particular embodiments annotate or label row boundaries, column boundaries, as well as the type of column or header (e.g., "description" and "amount"). Some embodiments also label false positive tables (e.g., non-line-item tables).

In some embodiments, the final model is trained on AWS Sagemaker. The training time, in some instances, is roughly 34 hours to complete. Object detection models are usually scored in some form of Intersection Over Union (IOU) at a given threshold, say at 0.5 or average across a range of thresholds. Various embodiments process the collective different scoring metric that considers the word boxes from OCR. First, embodiments define the notation:

True Positive (TP)=# of words inside table and predicted inside table (correct)

False Positive (FP)=# of words outside table and predicted inside table (incorrect)

False Negative (FN)=# of words inside table and predicted outside table (incorrect)

With this convention, the following the accuracy is defined: Accuracy=TP/(TP+FP+FN). This metric is penalized by generating FP and FN (larger denominator). Moreover, when FP=FN=0, then Accuracy=100%, which means there is a box that encloses only the words of interest. Further, the words of interest may be defined to be the words that are enclosed in the union of the Header and Rows that make up the table. Note not all documents could be used in the accuracy calculation as some documents do not have the associated OCR.

FIGS. 6A through 6C describe how rows and columns are extracted from a detected table (e.g., via the line item extractor 106 of FIG. 1). FIG. 6A is a schematic diagram illustrating that a table 600, without a visible lines defining the table, has been detected (e.g., by the table detector 104), according to some embodiments. In some embodiments, the line item extractor 106 takes three inputs: an image, Google OCR.json, and the coordinates for a bounding box (e.g., 601-1 of FIG. 6A) that defines the boundaries of the line item table 600. While many intermediate values can be output from the line item extractor 106, in some embodiments, the main output is an N×M table that represents the original line item table found on a document, with N>0, M>1. To be a valid line item table, some embodiments require at least two columns: a description column and an amount column. Some embodiments disregard all other columns when it comes to functionality performed by the expense row matching predictor 112. Additionally, various embodiments return the coordinates for bounding boxes of the table, and any row, column, cell (intersection of a row and column), or word within the table. In some embodiments, the pseudo code sequence indicated below describes the process for extracting columns and rows:

| driver_function.driver_function | Entire function for finding rows/columns |
|---|---|
| get_all_img_info.get_all_fields_for_li | Prepares ocr and bounding box |
| find_line_items.column_extractor_all | Finds columns |
| header_detection.get_header | Finds header |
| grid_structures.get_grid_structures | Finds gridlines, and if they exist, uses these to divide columns |
| deskew_module.deskew | Deskews image to help with gridline detection |
| IF NO VERT LINES: | |
| get_columns . . . (many) | Finds whitespace between columns, and uses these to divide columns |
| get_columns.get_amount_and_description_columns | Scores columns to decide which are the description/amount columns |
| find_line_Items.find_fine_items | Finds rows |
| IF NO HOR LINES: | |
| row_finder.just_row_finder | Finds single-line rows |
| outlier_detection . . . (many) | Removes outlier single-line rows that are likely not in a line item row |
| first_clustering.get_clusters | Prepares wordboxes for clustering |
| first_clustering.cluster_and_plot | Clusters words into rows |
| post_processing_check_valid_line_item | Checks to see if row should be discarded and/or merged |
| post_processing_final_line_items | Determines best way to discard/merge rows to create final line item rows |
| get_all_img_info.get_text_from_grid | Creates final pandas_df for output | words that make up the table. For example, an image may include 3 bounding boxes (e.g., green, blue, yellow) at three different coordinates around the same table. In terms of IOU the blue bounding box, for example, may be the most accurate. In this case, each bounding box may be equally accurate as the three may enclose the correct words that make up the table. Therefore, some embodiments use a In some embodiments, the line item extractor 106 has four main steps: (1) preparing the OCR; (2) finding columns; (3) finding rows, and (4) formatting the final output. These functions are outlined in the pseudocode sequence indicated above. In some embodiments, the main function of the line item extractor is driver_function.driver_function, which calls the four steps of the algorithm. In Step 1, Google OCR coordinates are converted back into the original coordinates for the image and all words within the Table Predictor bounding box are stored temporarily in a dataframe.

In Step 2, and as illustrated in FIG. 6B, particular embodiments find the table header (e.g., "Due Date"), using a heuristic scoring function that takes advantage of the fact that certain keywords are usually contained in the header and the fact that a header must be at the top of a table (and specifically the top of each column). Some embodiments do not consider a line item table to be valid if it does not have a header which names each column. Some embodiments then use computer vision techniques to see if vertical and/or horizontal lines exist within the table to delineate columns and rows. To aid with this, some embodiments use a deskew function which will rotate the image a small amount as necessary. In some embodiments, if vertical lines are found within the table, then those lines define the bounding boxes for the columns, and these bounding boxes are almost always correct. If particular embodiments do not find vertical lines within the table, as illustrated in FIG. 6B, particular embodiments use the get_columns functions, which use spacing between words in the header as well as the body of the table to determine where columns begin and end. Once particular embodiments determine the column coordinates (from either approach), some embodiments use a heuristic scoring function or NLP to determine which column is the description column (e.g., the column 607) and which is the amount column (e.g., the column 609). Features that give a column a higher score include having many words (description column), containing mostly float values (amount column), relevant keywords in the header (amount and description column), and being closer to the right edge of the table (amount column). With respect to FIG. 6B, for example, the table 600 has been parsed into columns 603, 605, 607, and 609.

For Step 3, and with respect to FIG. 6C, now that embodiments have identified the header and columns, particular embodiments responsively extract the rows of the table 600. If particular embodiments have found horizontal lines before, then these embodiments use these as dividers between the rows. Otherwise, and as illustrated in FIG. 6C, particular embodiments first find the number of amounts present in the amount column 609. An example of this is shown in the line item table 600 of FIG. 6C, which is divided by whitespace to find columns and clustered to find rows—rows 611, 613, 615, 67, 619, 621, 623, 625, 627, 629, and 631. This illustrates how many rows are to be processed, as each row, in some embodiments, must have one and only one amount (e.g., row 611 has one amount of 445.79). Some embodiments then remove from consideration all words that are a large vertical distance away from any amount, as these are likely extraneous text in the line item table that are not part of any line item row. Next, some embodiments use a hierarchical clustering algorithm to cluster words (e.g., "amortization charge") into the appropriate rows, based on the words' y-coordinates. Responsively, some embodiments engage in post-processing functions to ensure that every row is valid (e.g., a valid line item). In some embodiments, a valid line item means that it has a description and nonzero amount, it has one and only one amount, and/or a few other heuristic checks (removing subtotal and total rows, etc.). Some embodiments discard or merge invalid line items, until particular embodiments extract the correct number of rows given the number of amount values in the amount column.

In the final step, Step 4, particular embodiments create the final dataframe representation of the line item table on the page. Each cell in the dataframe is the intersection of a row and column found in Steps 2 and 3. Every row/column intersection will create a cell, though the string within the cell may be empty. To determine the string to be contained within each cell, some embodiments use a heuristic-based string merger, as some embodiments use word-level Google OCR, and based on punctuation and other English grammar rules, some embodiments determine where every space goes in each string. The final result is then sent to a pandas dataframe, which can then be easily converted to a json string.

Figure 7:
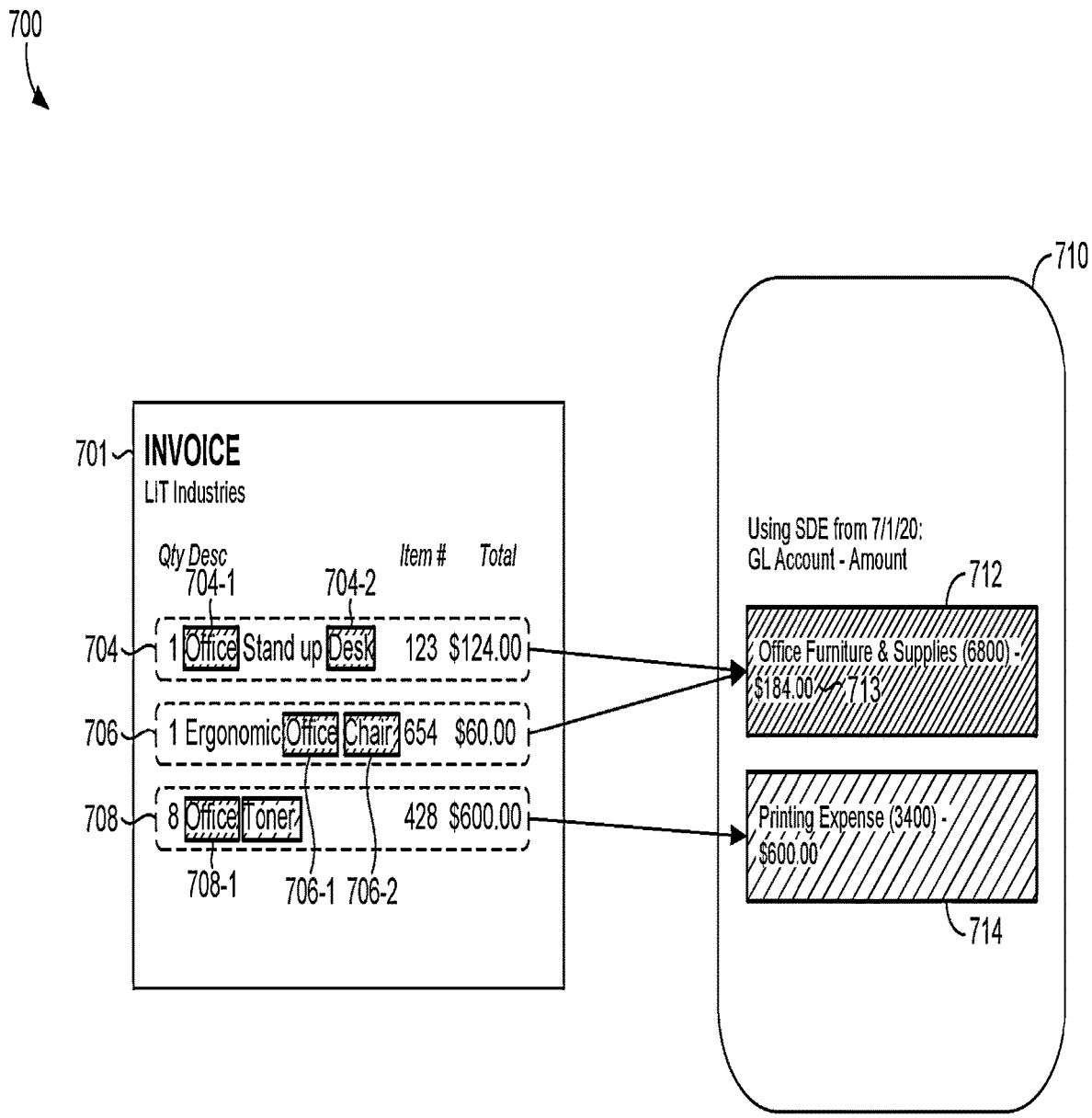
FIG. 7 is a schematic diagram illustrating how different line item expenses or rows are mapped to a data object representing a candidate category and how values can be aggregated in order to produce a document, according to some embodiments.

FIG. 7 is a schematic diagram illustrating how different line item expenses or rows are mapped to a data object representing a candidate category and how values can be aggregated in order to produce a document 710, according to some embodiments. In some embodiments, the table (including rows 704, 706, and 708) of the invoice document 501 represents the output table 204 of FIG. 2 or the table 600 of FIG. 6C. Likewise, in some embodiments, the bookkeeping document 710 represents the bookkeeping document 210 of FIG. 2. In some embodiments, FIG. 7 represents functionality performed by the expense row matching predictor 112, as described herein.

Various embodiments parse each word of each of the row 704, 706, and 708 and then map those words to particular data objects that are indicative of candidate categories that the rows belong to. For example, such mapping may include determining a similarity score between the rows 704, 706, and 708 and the "Office Furniture & Supplies" data object 712, as well as the "Printing Expenses" data object 714. For example, with respect to a single row 704, some embodiments can encode the word "office" 704-1 into a first feature vector and encode the word "Desk" 704-2 into a second feature vector and then combine these feature vectors (e.g. via a dot product) into a first concatenated feature vector. Embodiments can additionally encode the data object 712 into a third feature vector and encode the identifier 714 into a fourth feature vector. The first concatenated feature vector may be closer in distance to the third feature vector relative to the fourth feature vector. Accordingly, particular embodiments responsively map the row 704 to the data object 712, such that the output document 712 produces the data object 712. This process can then be repeated for rows 706 and 708. As illustrated in FIG. 7, the row 706 is mapped to the same data object 712, but the row 708 is mapped to the data object 714. In response to such mapping, and in some embodiments, the numerical "amount" values of each row that has been mapped to the same data object are aggregated. For example, because rows 704 and 706 are mapped to the same data object 712, the values $124.00 (from row 704) and $60.00 (from row 706) are summed to arrive at the total value of $184, as denoted by 713.

Figure 8A:
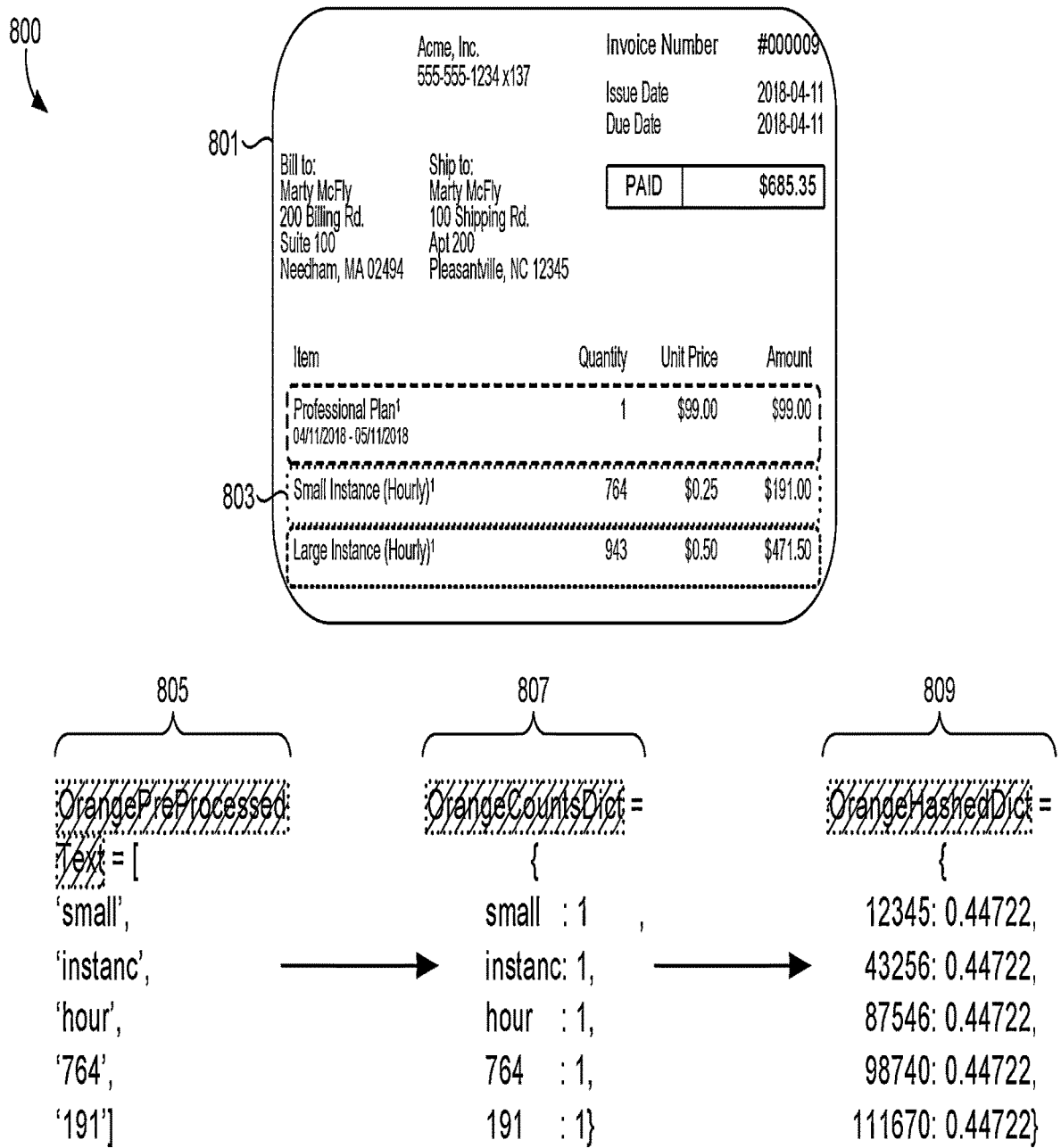
FIG. 8A is a schematic diagram that describes how weight vectors are created from training jobs, according to some embodiments.

FIGS. 8A through 8D are schematic diagrams that illustrate how new documents or document elements are generated, according to some embodiments. In some embodiments, the functionality described with respect to FIGS. 8A through 8D are performed by the expense row matching predictor 112 of FIG. 1. FIG. 8A is a schematic diagram that describes how weight vectors are created from training jobs, according to some embodiments.

In some embodiments, a feature vector for a given account (e.g., a GL account) or a data object is a representation of every word in every LIR or row that has been categorized into that particular data object or category ever. For example, referring back to FIG. 7, only the words 704-1, 704-2, and 706-2 may have been categorized under the data object 712. As illustrated in FIG. 8A, in some embodiments, weights (e.g., the weight vectors 418) are float values from 0 to 1, and are calculated such that the norm or magnitude of the vector is equal to 1. In some embodiments, these weights are proportional to the frequency of the word in line items in the account, and decay over time. The higher the frequency of the word, the higher the weight. For example, a row with the string "chair" may be given a weight of 3 (or 0.3), which is directly proportional to the quantity.

For inference, various embodiments start by pre-processing text found in each row (e.g., row 803), as illustrated by the transition between 805 and 807, where 805 represents pre-processed text found within the row 803 and 807 represents the corresponding processed text. In some embodiments, pre-processing includes removing capitalization, punctuation, a custom list of common stop words (these can be created by finding words that appear on >1% of bills on a representative sample of bills) and then taking words off the stop word list if they were key to understanding a line item or row, e.g. 'tax', 'ship',), and word stemming using the NLTK Porter Stemmer, for example. Particular embodiments allow alphanumeric and numeric tokens (or words), as item numbers, quantities, amounts, which can all be useful when these values are rare and repeated. Particular embodiments then count the occurrences of each word in the line item or row, and use scikit-learn's HashingVectorizer to convert these counts into a feature vector. For example, referring to element 807, the count is equal to "1," as the corresponding values only occur once in the row 803.

Using a hashed vector allows particular embodiments to handle new words gracefully, use less disk space, and may not be reversed, allowing particular embodiments to use this method to effectively store information about PII without actually storing PII. As illustrated in element 809 of FIG. 8A, particular embodiments then normalize the sparse vector created by the Hashing Vectorizer so that it has a magnitude of 1. This leads to values associated with each word to shrink in the case from 1 to 0.44722. In this way, embodiments can correctly compare vectors even if they have a different number of words. This vector may be of dimension $2^{20}$ (~1M)×1, which should be of sufficient size to contain more than every word in the English language (~200K words). With a HashingVectorizer, there may be a very small chance of collisions, where two different words will hash into the same hash value, and appear to be the same word to a model. In practice, however, this is highly unlikely.

FIG. 8B a schematic diagram that illustrates how similarity scores are derived using the values indicated in the element 809 of FIG. 8A, according to some embodiments. In some embodiments, a line item vector or any feature vector of a row is then formed as a weighted average of the vector created from the words in the line item (e.g., "OrangeHashedVector") as well as all words found on the page (i.e., represented as "GreenHashedVector"). The weights (e.g., the weigh vectors 418) for this average are 80% (0.8) and 20% (0.2) for line item words and full page words, respectively, and these values may have been arrived at by experimenting and tuning these parameters. In some embodiments, to determine the similarity between a line item's or row's vector and a data object (e.g., GL account) vector (e.g., a vector that represents a candidate category that the row belongs to), the algorithms takes the dot product of the two feature vectors, with perfectly similar vectors have a dot product of 1, and perfectly orthogonal vectors, or vectors with no shared words, having a dot product of 0.

Some embodiments then combine these dot products, or similarity scores, with what can be called the "prior" beliefs regarding the bill, which may be similar to work done in Bayesian statistics. In particular embodiments, the prior beliefs utilize the bills that have already been entered by the entity for the same vendor. Some embodiments use an extended version of Smart Data Entry, which uses 10 bills in the past if available rather than just 1 bill back, to create these priors. Some embodiments use a simple weighting rule which gives more probability to schemas on more recent bills in Smart Data Entry, as well as more probability to schemas that appear multiple times in Smart Data Entry. Some embodiments replace this simple heuristic rule for the priors with a "Smarter Data Entry" sub-model, which will create more predictive probabilities from the length-10 Smart Data Entry information.

In FIG. 8B, it is noted that the "RedHashedVector" corresponds to the row 811, the "OrangeHashedVector" corresponds to the row 803, and the "YellowHashedVector" corresponds to the row 813. In some embodiments, every LIR or row vector contains a weight value from every word on the page from the "GreenHashedVector," as illustrated by the 0.2 value.

FIG. 8C is a schematic diagram illustrating how the generated similarity scores are used to make final predictions for generating documents or document elements, according to some embodiments. Particular embodiments combine vector similarity scores with SDE prior probabilities described in FIG. 8B to arrive at a final prediction. In some embodiments, such final prediction must match a schema found in the length-10 Smart Data Entry. In some embodiments, when combining vector similarity scores with the SDE prior probabilities, particular embodiments also multiply the data object vector (e.g., a vector representing a candidate category) by a coefficient that scales logarithmically with the number of line items or rows that have historically been placed into the category or historical document. This makes candidate or documents with many line items slightly more likely to become the final prediction, and categories or documents with <10 line items much less likely to become the final prediction.

FIG. 8C illustrates that the highest similarity score for row 811 (i.e., Vector_LIR1) is 0.71, as indicated by the row 815. Row 815 illustrates that GL4 (e.g., the data object 206-2) is most similar to the row 811 (e.g. the "toner" row of the table 204) relative to any of the other GLs, such as GL1, GL2, GL3, and GL5 (e.g., the data objects 206-1). Likewise, the highest similarity score for rows 803 and 813 are 0.32 and 0.35 respectively, as indicated by the rows 817 and 819 respectively. These rows illustrate that GL3 (e.g., the data object 206-1) is most similar to both of the rows 803 and 813 (e.g. the "chair" and "desk" rows of the table 204) relative to any of the other GLs, such as GL1, GL2, GL4, and GL5 (e.g., the data objects 206-2 and 208-1). Accordingly and consequently, for example, as illustrated in FIG. 7, the rows 704 and 706 are mapped to the data object or category 712 and the corresponding numerical values are aggregated.

Because extra dimensions such as Department, Location, Class, and Job tend to be consistent between bills when conditioned on having the same GL Account for a vendor-org pair, particular embodiments can carry over the Department, Location, Class, and Job from the selected historical schema to the current prediction and be correct more often than not. Some embodiments use a more sophisticated model which can predict each of these extra dimensions in addition to GL Account. Some embodiments also carry-forward EIR Descriptions from the selected historical SDE schema, though users will often end up changing these.

Once a new document (e.g., the document 210) has been generated and the user has received the model's predictions, some embodiments give an option in at the UI to accept the predictions or make changes to the predicted data objects. These changes may be provided as feedback necessary for to improve and re-train the model over time. In some embodiments, there will be no changes to the data object UI as a result of the Line Items endpoint. Because of this, in some embodiments, the only source of feedback for re-training data will be the 'billineitem' table in Oracle/Athena. Using this table, particular embodiments are able to reverse-engineer which LIRs a user placed into which data objects in all cases where a user does not split an LIR into multiple data objects (e.g., EIRs). In all other cases (one-to-one, grouping of LIRs into EIRs), which are by far the majority of bills, embodiments are able to determine the "correct" EIR schemas and amounts. Particular embodiments then use the correct LIR groupings to retrain the data object vectors at a regular interval, enabling embodiments to create more accurate predictions over time and making the Line Items endpoint a "sticky" feature, in that the features get better over time, and the user will face a higher cost to switch services to another platform due to the fact that the other platform will not have learned their EIR patterns like particular embodiments have.

In some embodiments, line item endpoints collectively have four inputs. The first input may be an image (e.g., the image 402 of FIG. 4). In some embodiments, the image is received in PIL format from a common pre-processing endpoint. In some embodiments, the image is grayscale and contain only one page, which may be necessary for the Table Detection and Line Item Extractor models.

In some embodiments, the second input is OCR (e.g. 406 of FIG. 4). The OCR may be received in json format as created by the Google Vision OCR endpoint. This may be necessary for the Line Item Extractor (e.g., 410) and Label Detection models (e.g., 420). In some embodiment, Smart Data Entry (SDE) is also an input. In some embodiments, the SDE data for the previous 10 bills for the vendor-org pair includes all dimensions from EIRs (GL Account, Description, Amount, Department, Location, Class, Job). As a result of this, the endpoint may be indirectly dependent on the IVA vendor name models, as the vendor name is used to pull the correct Smart Data Entry in some embodiments, which may be required for the Expense Row Matching model (e.g., 420 of FIG. 4).

SDE is Bill.com's heuristic algorithm that saves users time on data entry when completing the EIRs for a bill. The algorithm is as follows: when a bill is uploaded to the Inbox and IVA makes predictions for the Five Fields, the IVA-predicted Vendor Name is then used as an input to Smart Data Entry. Smart Data Entry then returns to the user the EIRs entered by the user on the most recent previous bill that the current org has saved for the same vendor. Smart Data Entry will carry forward and auto-fill into the Neo UI the exact EIRs from this specific bill, excluding the EIR Amounts. The EIR Amounts are not presented to the user because total bill amounts change from bill to bill even with the same org and vendor, so with SDE users are required to manually enter the EIR Amounts and complete them in such a way that the EIR Amounts sum to the total bill amount. Accordingly, various embodiments expand on SDE in at least three ways: first, particular embodiments provide more accurate predictions of the bill's EIRs, second, some embodiments predict EIR Amounts, and third, some embodiments show in the UI where the LIRs on the document came from, and how the EIR predictions combined LIRs to reach the final output.

Various embodiments convert or map LIRs to EIRs (or perform numerical operations) in any suitable manner. Such mapping can include categorizing (as indicated in EIRs), in natural language, particular LIRs and/or performing different numerical operations (e.g., addition, division, subtraction. Accordingly, LIRs can be grouped, split, or mapped to EIRs in different ways. For example, there may be a some-to-one mapping. In an illustrative example, 4 line items and their individual expenses ($10 each) can be mapped to a single data object or EIR (e.g., a category of the individual expenses with $40 indicia). In another example, there may be a more-to-fewer mapping. In an illustrative example, three LIRs can be mapped to a first EIR and a second LIR on the same document as the three LIRs can be mapped to a second EIR located on the same document as the first EIR. In yet other examples, there may be a some-to-some mapping. For instance, a first LIR on a first document may be mapped to a first EIR on a second document and a second LIR on the first document may be mapped to a second EIR on the second document.

In another example, there may be a one-to-some mapping. For instance, a single LIR can be split up into three EIRs. In an illustrative example, a single invoice with a line item row that says lawn care $400, can be split up into a first EIR—"edging $100," a second EIR—"mowing $200," and a third EIR—"bush trimming $100." In yet another example, there may be a fewer-to-more mapping. For instance, a first LIR on a first document can be mapped to a first EIR on a second document and a second LIR on the first document can be mapped to a second EIR and third EIR on the same second document. In yet another example, there may be a one-to-one mapping. For example, a first LIR on a first document can be mapped to a first EIR on a second document. For example, a first LIR that states, "lawn care $400" can be mapped to a EIR that states "landscaping $400." This takes into account that bookkeeping entities may describe the same services differently relative to entities that create an invoice.

In some embodiments, line items endpoint handles mapping and grouping, but does not handle splitting, though this may be added in future versions of the model.

In some embodiments, the IVA predicted amount (e.g., 309 of FIG. 3) is the last input for line items endpoints. In some embodiments, the final amount predicted for the bill by IVA that is returned to the user allows us to account for amounts that are both outside of the line item table using the Label Detection model. In some instances, this is required for the Label Detection and Expense Row Matching models.

In some embodiments, Endpoints will receive a subset of these four fields packaged together in one json-formatted string sent from ml_gateway, and will then send the model's results to ml_gateway as well, before being passed back to Cyclops and eventually the end user in the Neo front-end. The output of the endpoint can include, at a minimum, the descriptions, amounts, and coordinates of each LIR and the predicted EIRs for the bill. Additional intermediate information can be passed as output as needed.

While the majority of the infrastructure for the Line Items endpoint can look similar to that of other recent endpoints (ml_lambert, ml_dli_field_extraction, ml_split_docs), there are some key challenges that are unique to the Expense Row Matching model.

In some embodiments, the GL vectors (e.g., as illustrated in FIG. 8C) represent all words from LIRs that have been assigned to the GL account in the past, weighted according to frequency and recency. An example of a GL vector can be seen in FIGS. 8A through 8C, where each integer represents a word and each float represents the weight associated with the given word. This data can be saved on disk within the SageMaker endpoint instance in two files: a.hdf5 file that stores a sorted array of the orgid, chartofaccountid, and other metadata related to each GL account, and a.npz file which holds all of the sparse GL vectors in one large sparse CSR SciPy matrix. The.hdf5 file is used to lookup the relevant locations in the sparse matrix for a given org. By design, the.hdf5 file is stored on disk and slices of the file are brought into memory as necessary, while the entire.npz file is stored in memory.

In some embodiments, these GL vector files will be static, meaning that we will not be changing or re-training the vectors continuously. The impact of this to the end user will be minimal and will only become apparent until the next re-training job if a user changes their GL Account patterns abruptly from historical patterns.

Particular embodiments run re-training jobs once every two weeks or other time interval to update the Expense Row Matching model's GL vectors, with the hope to eventually move towards automated training jobs. This re-training can make the model more accurate over time. For re-training, some embodiments encrypt and save LIR descriptions, amounts, all other columns, as well as label detection results in S3 temporarily in the iva-prod bucket. This would occur when the endpoint's results are returned to Cyclops, and ideally could be coupled with the saving of OCR and image files to S3 by Cyclops. This is because some embodiments need to know the exact words that were in each LIR to create the LIR's vector, which can then be averaged into the re-trained GL vector. Some embodiments create an automated AWS Lambda job that will run re-training, and if the produced GL vector files are validated, the re-trained GL vector files will then be saved to the S3 bucket which is accessible by the ml_line_items SageMaker endpoint. Some embodiments use both the saved LIR information in iva-prod as well as information from the Oracle/Athena 'billlineitem' table to reverse engineer which LIR was categorized into which EIR.

In some embodiments, with the introduction of UI changes, users will be able to drag-and-drop LIRs into the correct EIR, allowing particular embodiments to eventually save and use this information directly into a file in S3's iva-prod and bypass the 'billlineitem' table. This allows embodiments to collect re-training data on two additional categories of bills that would have to be ignored—bills where a LIR is split into two or more EIRs, and bills where multiple LIRs have the same amount. To summarize, in some embodiments, files saved in iva-prod will contain only a description and amount for each LIR, while in other embodiments, files saved in iva-prod will contain a description and amount for each LIR as well as an index indicating to which EIR the user assigned the LIR in the UI.

FIG. 9 is a schematic diagram illustrating accuracy results of particular embodiments relative to existing technologies. FIG. 9 thus represents actual experimental data. Table 901 show the accuracy of Smart Data Entry (SDE) technologies for the stratified sample, as compared to the accuracy of embodiment described herein, as illustrated in the table 903. In some embodiments, accuracy is defined as the percentage of line items on a page categorized in to the correct GL account or data object. Accuracy gains are large for high-volume organizations, as well as bill-splitter organizations. For overall accuracy, SDE categorizes a line item into the correct GL account 75% of the time, while particular embodiments do so at least 80% of the time, with much larger accuracy gains (up to 14 percentage points) in some organization categories.

Figure 10:
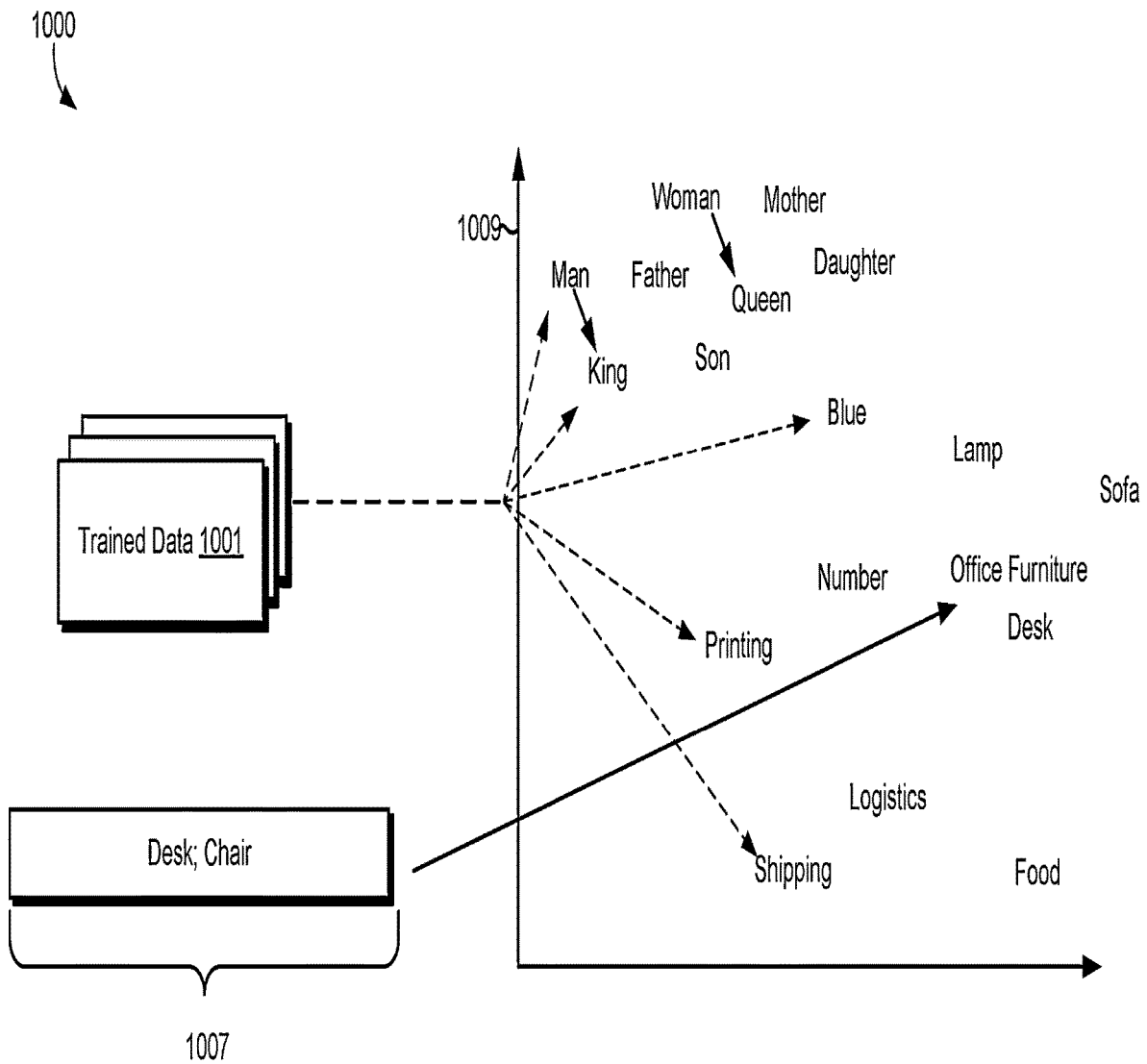
FIG. 10 schematic diagram illustrating how vectors associated with words belongs to rows and data objects are run through an NLP-based model that outputs a word embedding, according to some embodiments.

FIG. 10 schematic diagram illustrating how vectors associated with words belongs to rows and data objects are run through an NLP-based model that outputs a word embedding, according to some embodiments. In some embodiments, FIG. 10 represents or includes the functionality described with respect to block 1108 of FIG. 11.

In some embodiments, the NLP-based model of FIG. 10 is a WORD2VEC model. A WORD2VEC model is a two-layer neural network model that runs one or more input vectors (e.g., words in the set 1007) through a hidden layer (i.e., a column-row matrix) and a projection layer (e.g., a softmax classifier). Word2vec models predict target strings (e.g., "office furniture" in the feature space 1009) from source context words (i.e., via the Continuous Bag of Words (CBOW) algorithm) or inversely predict source-context words from target words (i.e., via the skip-gram algorithm). In embodiments, when words are processed through a corresponding WORD2VEC or other word embedding model, the words are numerically represented in a word embedding that shows associated vectors and the distances from the string representations to each of those vectors, which is described in more detail below.

In order to embed or place points or vectors within the vector space 1009, the model is trained using training data—i.e., the training data 10001 (individual words). In various embodiments, the training data includes a large corpus of unstructured data semi-structured, and/or structured data. The training data 1001 is also an input of the NLP-based model. The training data includes some or each of the words as found within the feature space 1009—man, king, office, shipping, etc.

In some embodiments, the feature space 1009 represents a "pre-trained" embedding. A pre-trained embedding is a static model that is generated without feedback, retraining, or reference to the data sets being fed through it. For example, a user may download a static word embedding from an online source, which is already trained and includes the vectors or data points already mapped in vector space according to semantic similarity between words. In other embodiments, the vector space 1009 represents a "retrained" or trained embedding. A retrained or trained word embedding receives training feedback after it has received initial training session(s) and is optimized or generated for a specific data set (e.g., for specific invoices and/or bookkeeping documents).

In order to map each of the word of the trained data 1001 (or the word "desk" in the set 1007) to its contextually appropriate point in the vector space 1009, training algorithms are utilized. For example, in some embodiments, the NLP-based model is trained using the maximum likelihood (ML) principle to maximize probability of the next word $w_t$ (i.e., "target") given the previous words h (i.e., "history") in terms of a softmax function:

$$P(w_t \mid h) = \text{softmax}(\text{score}(w_t, h)) = \frac{\exp\{\text{score}(w_t, h)\}}{\sum_{\text{word } w' \text{ in } Vocab} \exp\{\text{score}(w', h)\}}$$

Where score ($w_t$, h) computes the compatibility of word $w_t$ with the context h. The model is trained by maximizing its log-likelihood on the training set, that is maximizing $$J_{ML} = \log P(w_t \mid h) = \text{score}(w_t, h) - \log\left(\frac{\exp\{\text{score}(w', h)\}}{\sum \text{Word } w' \text{ in } Vocab}\right)$$

This yields a properly normalized probabilistic model for language modeling. Each probability is computed and normalized using the score for all other words w' in the current context h at every training step. In some embodiments, some models, such as WORD2VEC, are trained using a binary classification objective, such as logistic regression, to discriminate the real target words w, from K noise words w", in the same context. Accordingly, instead of a softmax classifier, a noise classifier is used.

The output of the training algorithms and/or actual data input is each of the positional words in the vector space 1009, which shows groupings of words that are similar (e.g., semantically similar). "Semantic similarity" is the semantic distance between two or more concepts (e.g., vectors representing words as found in an object or line item row). The "distance" between any two or more words in some embodiments is based on the similarity of their meaning and/or semantic content, as opposed to any syntax similarity.

In some embodiments, the output as represented in the vector space 1009 is computed based on a NLP-based model computing semantic similarity between words. For example, a vocabulary set (e.g., all the words in the vector space 1009) may first be converted into input vectors via an input vector encoding (e.g., one hot encoding). For example, the word "shipping" may be converted into the vector [1,0,0,0,0]. This vector representation shows various dimensions, where each value corresponds to ordered words (e.g., each word in a set of trained test data candidates) and whether the word is TRUE or present. Because "shipping" is the only word being run through the NLP-based model in this example, the integer 1 is used to indicate its representation. "Shipping" does not contain any of the other words within it (e.g., "food" or "man") so the other values are represented as 0. In some embodiments, based on generating the softmax function above or the output layer of the neural network, an output embedding vector representation can be generated, which is indicative of the actual coordinates that a vector will be embedded or placed in vector space 1009 based on semantic similarity to other words and/or averaging or otherwise combining the output embedding vectors for all of the words within a particular data object (EIR) or row (e.g., a LIR). For example, using the illustration above, the "shipping" vector [1,0,0,0,0] can be converted to an output layer vector [1,2], which is the 2-dimensional plotting coordinates in vector space 1009.

The distance between any two vectors or words is measured according to any suitable method. For example, in some embodiments, automated cosine similarity is used to compute distance. Cosine similarity is a measure of similarity between two non-zero vectors of an inner product space that measures the cosine of the angle between the two non-zero vectors. In these embodiments, no similarity is expressed as a 90 degree angle, while total similarity (i.e., the same word) of 1 is a 0 degree angle. For example, a 0.98 distance between two words reflects a very high semantic similarity while a 0.003 distance reflects little semantic similarity. As illustrated in the vector space 500-1, for example, the cosine similarity between "man" and "king" and "woman" and "king" are the same cosine distance, thus "king" in certain situations is semantically similar to "king" given the different input of "man" and "woman" are used. In some embodiments, the distance is represented as an average distance or the distance between a particular vector in vector space 1009 and an average of other terms. In some embodiments, the distance is represented via fuzzy matching.

In some embodiments, FIG. 10 represents or includes a word-category co-occurrence matrix (e.g., a compilation of vector spaces). A matrix includes one or more vectors of a first vector space multiplied by one or more vectors of a second vector space (e.g., multiplying each word in a test case identifier and/or test data candidate to get a final distance). This allows rows within the vector space to be normalized for summing to 1 to become a probability distribution. Words or vectors can be compared using their category distribution. In some embodiments, each vector representing a word in a set of LIR and/or an EIR (e.g. other data object) is combined or aggregated (e.g., via a dot product operation) with another word in the same or other LIRs and/or EIR in order to get an aggregated score or distance any particular set of LIRs are to an EIR or other data object. For example, the "desk" and "chair" set 1007 may represent the "1 desk" LIR 202-1 and the "1 chair" LIR, both words of which can be aggregated via a dot product such that it is semantically similar to "office furniture," such as the data object 210-1 of FIG. 2.

After the training data 1001 is run through the training algorithm, the output is represented in the feature space 1008. In some embodiments, in response to generating the training data 1001 in the vector space 1009, the word set 1007 is received. In response to receiving this word set 1007, particular embodiments map each word in the word set 1007 according to its semantic similarity to other words within the vector space 1009. For example, the term "desk" can be mapped to its place in feature space 1009. As described herein, some embodiments aggregate or combine such mapping (e.g., via a dot product function) with other mappings of the data set 1007 in order to determine the overall or aggregated distance between one or more line item rows and a particular EIR. For example, FIG. 10 illustrates that that the data set 1007 is closest, in distance, to the EIR of "Office Furniture." Accordingly, as described with respect to FIG. 2, the corresponding numerical values of the LIRs ($124.00 and $60) can be aggregated (i.e., $184) and then categorized under the data object 210-1.

Figure 11:
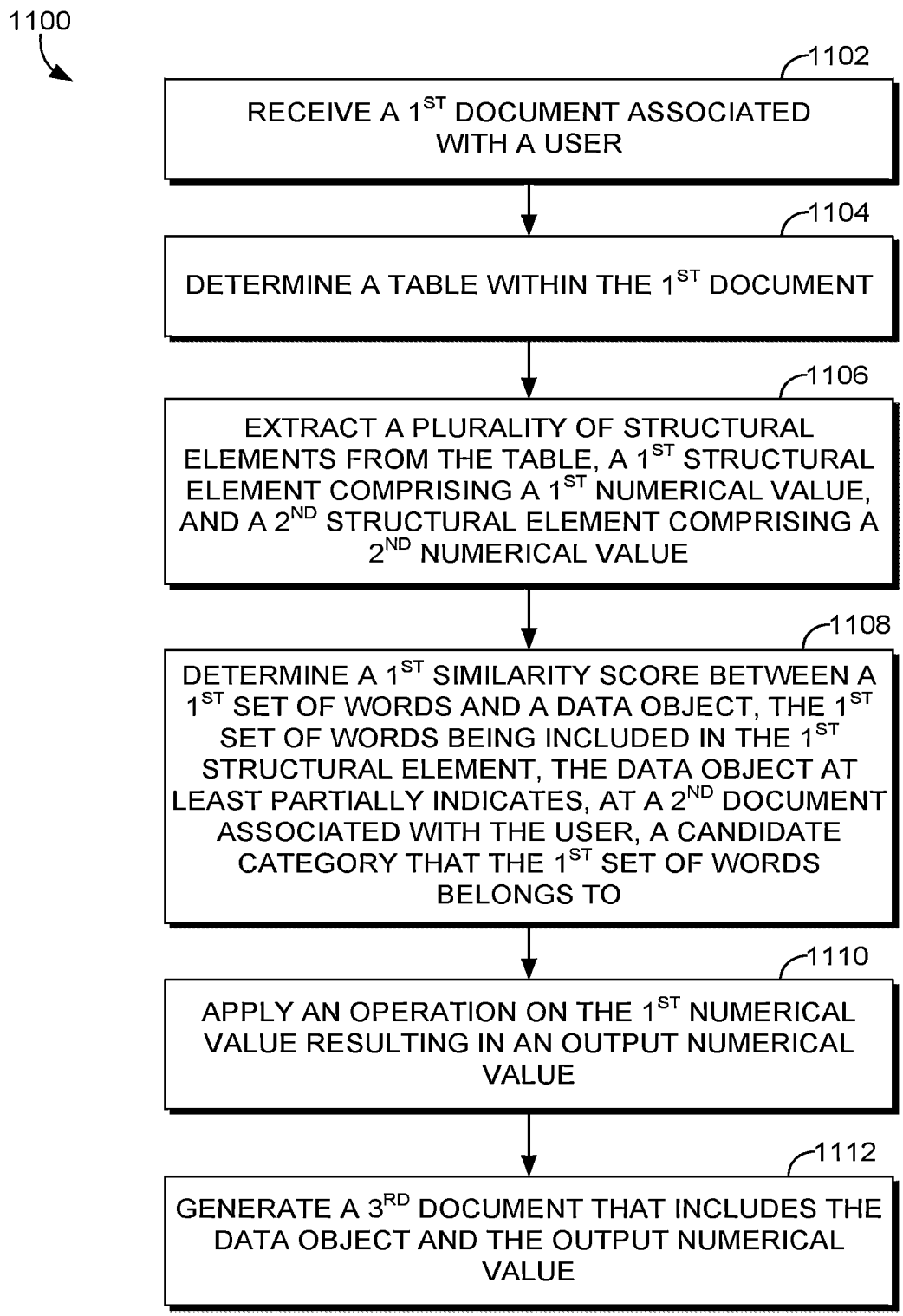
FIG. 11 is a flow diagram of an example process for generating a document, according to some embodiments.

FIG. 11 is a flow diagram of an example process 1100 for generating a document, according to some embodiments. The process 1100 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 10). The computer-implemented method, the system (that includes at least one computing device having at least one processor and at least one computer readable storage medium), and/or the computer readable medium as described herein may perform or be caused to perform the process 1100 or any other functionality described herein.

Per block 1102, particular embodiments receive a first document associated with a user. Examples of this block are described with respect to the document conversion module 102 of FIG. 1, the invoice document 202 of FIG. 2, and the like. For example, particular embodiments can receive an indication that a user of a particular vendor has uploaded an invoice document and subsequently obtain the invoice document for further processing. Some embodiments also convert the first document into an image as described, for example, with respect to the document conversion module 102 of FIG. 1.

Per block 1104, particular embodiments determine a table within the first document (e.g., in response to block 1102). Determining the table can mean detecting the table or receiving an indication (e.g., from another service) that a table has been detected. Examples of block 1104 are described with respect to the table detector 104 of FIG. 1, the table detector 303 of FIG. 3, the table detection module 404 of FIG. 4, FIG. 5, and FIG. 6A. In some embodiments, determining a table includes generating a set of bounding coordinates (e.g., actual coordinate values, a bounding box, a lasso, etc.) that define the table within the first document, as described, for example, with respect to FIG. 5. In some embodiments, the table describes individual item expenses or expenses for individual items (e.g., a line item table), as illustrated, for example, with respect to FIG. 5 and FIG. 6A, and the table 204 of FIG. 2.

In some embodiments, the generating of the set of bounding coordinates that defines the table (or determining table) includes determining that the table is a line item table based on the line item table having a natural language description column and an amount column, as described, for example with respect to the table detector 104 and the output table 204, where some embodiments search for a "description" and "amount" column (or semantically similar words) to detect or classify a table as a line item table.

In some embodiments, the generating of the set of bounding coordinates (or determining the table) is based on training, via a machine learning model, on multiple line item tables to detect the table. This is described with respect to the table detector 104 and FIG. 5. For example, particular embodiments use a Fast R-CNN model to detect the identity and location of line item tables.

In some embodiments, block 1104 includes determining that the table has lines that define the table in the first document such that the generating of the bounding box coordinates occurs over the lines based on the determining that the table has lines. In these embodiments, computer vision functionality can be used on the document to determine if there are lines. In some embodiments, however, block 1104 additionally or alternatively includes determining that the table does not have lines, such that the generating of the bonding box coordinates occurs over the words based on the determining that the table does not have lines, as illustrated, for example, with respect to FIG. 5.

Per block 1106, some embodiments extract a plurality of structural elements from the table, where a first structural element includes a first numerical value (e.g., $124.00) and a second structural element includes a second numerical value (e.g., $50). A "structural element" can refer to any structural feature of a table, such as one or more rows, one or more columns, and/or one or more cells. The "numerical value" can include any real number, such as a float or integer. Such numerical values typically indicate currency values in line item tables. In an example illustration of block 1106, some embodiments extract a plurality of rows from the table in response to the generating of the set of bounding box coordinates, where each row comprises a numerical value. Examples of block 1106 are described with respect to the line item extractor 106 of FIG. 1, the output table 204 of FIG. 2, the line item extractor 315 of FIG. 3, the line item extractor model 410 of FIG. 4, FIG. 6B, and FIG. 6C.

In some embodiments, the extracting of the plurality of rows or other structural elements includes deskewing the image of the table to assist with gridline detection of the table, as described herein. Some embodiments additionally determine (e.g., extract or parse) characters (e.g., words and numerical values) within the structural elements using OCR or the like, as described herein.

In addition to block 1106, some embodiments extract words outside of the table on the first document as described, for example, with respect to the external label detector 108 of FIG. 1, the label detection 319 of FIG. 3, and the "shipping: $10.00" indicia within the invoice document 202 of FIG. 2. Some embodiments additionally determine that the words do not belong to the candidate category or any category indicated at the second document and rather determine that the words belong to a second candidate category of a fourth document associated with the user, as described, for example, with respect to FIG. 2 and FIG. 3. For example, referring back to FIG. 2, particular embodiments can determine that the words "Shipping: $10.00" within the invoice document 202 may not belong to the candidate categories of the data objects 206-1 and 206-2 of the document 206. Rather, embodiments can determine that the words belong to the candidate category "freight expenses" of the data object 208-1 of the document 208 (i.e., the fourth document). In response to the determining that the words do not belong to the candidate category, particular embodiments generate, at the third document, a second data object that at least partially indicates the second candidate category. For example, referring to the illustration above, some embodiments generate, at the document 210, the data object 210-3 that indicates the same candidate category of "Freight Expenses."

Per block 1108, some embodiments determine a first similarity score between a first set of words and a data object, the first set of words being included in the first structural element, the data object at least partially indicates, at a second document associated with the user, a candidate category that the first set of words belongs to. A "similarity score" as described herein refers to a value indicator in terms of an actual number, an aggregation of numbers (e.g., a dot product), or distance (e.g., Euclidian distance) that indicates the similarity (e.g., in terms of semantic relationship between words or feature overlap) between one or more words in a structural element and a data object. The second document associated with the user can be, for example, a historical bookkeeping document that the same user or vendor has used in the past for categorizing item expenses. That is the historical bookkeeping document describes candidate categories that expenses belong to as illustrated, for example, with respect to the documents 206/208 of FIG. 2.

Examples of block 1108 are described with respect to the expense row matching predictor 112 of FIG. 1, the expense row matching 321 of FIG. 3, the IVA amount string 309, the expense row matching model 420, FIG. 7, FIG. 8A, FIG. 8B, FIG. 8C, and FIG. 10. For example, the similarity scoring can use hashed vectors and dot product functionality, as described with respect to FIG. 8B. Alternatively or additionally, distances between strings of a word embedding can be used as described with respect to FIG. 10.

In an illustrative example of block 1108, some embodiments encode a first one or more words in a first row, of a plurality of rows, into a first feature vector. Some embodiments subsequently compute a first distance (e.g., a Euclidian distance) between the first feature vector and a second feature vector, where the second feature vector represents the data object. These embodiments also encode a second one or more words in a second row, of the plurality of rows, into a third feature vector and compute a second distance between the third feature vector and the second feature vector. Examples of this are described with respect to FIG. 10, where feature vectors representing words can be embedded in a word embedding and subsequent distance determinations can be made. In some embodiments, "distance" determinations need not indicate distances between words in a word embedding but can refer to an actual numerical value difference in values between words and a data object, such as described with the dot product functionality described with respect to FIG. 8B.

Per block 1110, some embodiments apply an operation on the first numerical value that results in an output numerical value. Such "operation" can be any mathematically operation such as additional, multiplication, division, subtraction, and the like. Alternatively or additionally, the operation can refer to copying or carrying over a numerical value from one document to another, where the numerical value is the same but the document is different. Examples of block 1110 are described, for instance, with respect to the data object 210-1, where the numerical values $124 and $60 have been added to arrive at $184.

Some embodiments, apply such operation based at last in part on the first similarity score meeting a threshold. To "meet" a threshold can mean to exceed some predefined numerical threshold, to be inside of some predefined threshold (e.g., be close enough with regard to a distance threshold), or be outside of some predefine threshold. Alternatively or additionally, to "meet" the threshold can mean that the similarity score between a first set of words and a data object is higher than any other similarity score between the first set of words and other sets of data objects. This is described, for example, with respect to FIG. 8C, where the row 815 indicates that the similarity score between row 811 and GLA is the highest—0.71. Accordingly, the similarity score between row 811 and GL4 "meets" the threshold because it is the highest scoring pair, whereas the other row-data object pairs (i.e., GL1, GL2, GL3, and GL5) do not meet the threshold because they are not the highest scoring pairs.

In an illustrative example of the applying of the operation of block 1110, some embodiments aggregate a numerical value from the first structural element (e.g., row) and another numerical value from the second structural element (e.g., based at least in part on the first distance and the second distance being with the threshold). This is at least partially described, for example, with respect to the data object 210-1, where embodiments add $124 with $60. In this way, the aggregation is based on the first set of words and the second set of words in the second structural element being mapped to the same data object 210-1 via the similarity score meeting the threshold. To "aggregate" numerical values can mean to add, multiply, or otherwise mathematically combine numerical values.

In some embodiments, the applying of the numerical operation at block 1110 includes dividing (e.g., break or remove a value quantity from) the first numerical value to a first sub-value and a second sub-value such that the output numerical value includes at least one of the first sub-value and the second sub-value. For example, a description on the first document (e.g., an invoice document) can read "mowing service for July 2016 includes turf mowing, edging, trimming, blowing off surface areas, pick-up and removal of small trash/debris." And the "amount" can be $120. However, a first data object of a bookkeeping document can parse these description categories, such as "mowing" and "clean up." Consequently, particular embodiments can divide the $120 amount and place $100 (the first sub-value) into the "mowing" data object and $20 (the second sub-value) into the "clean up" data object. Some embodiments determine how to divide or otherwise break up these original values (e.g., $120) based on determining historical patterns within historical bookkeeping documents, such as the documents 206 and 208 (e.g., via a machine learning model). For example, the $100 may be indicative of the amount of money the same vendor has paid on the last 10 bills for mowing based on learning this pattern via a machine learning model.

In some embodiments, the applying of the operation of block 1110 includes copying the first numerical value from the first document to the data object at the third document such that the first numerical value at the third document is the output numerical value. Examples of this are described with respect to FIG. 2, where the shipping numerical value "10.00" (e.g., the first numerical value) is copied from the invoice document 202 to the data object 210-3 of the document 210.

Figure 12:
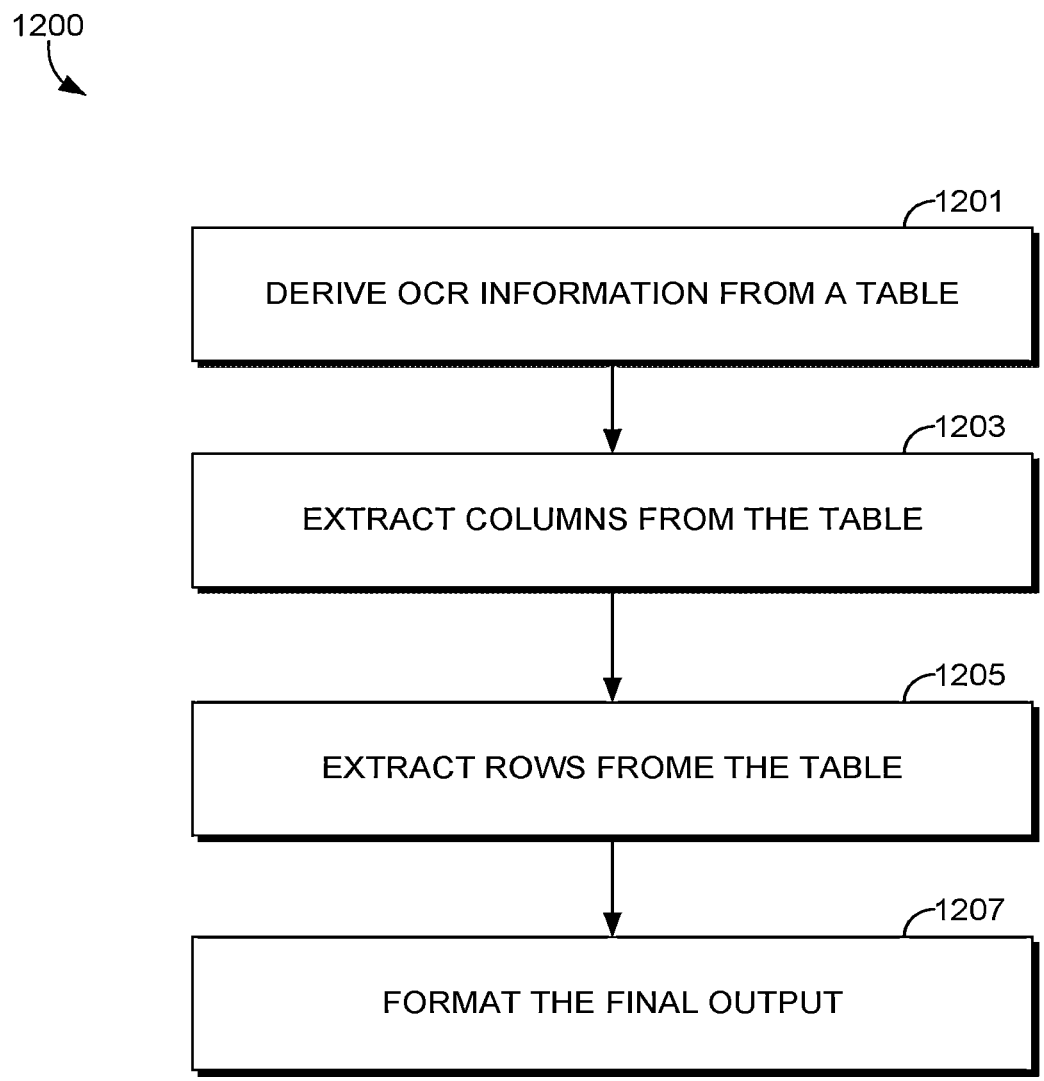
FIG. 12 is a flow diagram of an example process for extracting rows and columns of a table, according to some embodiments.

Per block 1112, particular embodiments generate a third document that includes the data object and the output numerical value. In some embodiments, the third data object is generated based at least in part on the applying of the operation at block 1110. Examples of this are described with respect to the output document 210, the prediction 422, and the document 710. For example, referring back to FIG. 2, the document 210 includes the data object 210-1, which is the same or similar data object as the data object 206-1 and the data object 210-1 of the same document 210 also includes the aggregated numerical values FIG. 12 is a flow diagram of an example process 1200 for extracting rows and columns of a table, according to some embodiments. In some embodiments, FIG. 12 represents the functionality of block 1106 of FIG. 11. Per block 1201, some embodiments derive OCR information from a table. Examples of this are described with respect to FIG. 6B and the pseudo code sequence where the driver function is called to derive image information for all fields, such as individual strings and numerical characters from cells or fields.

Per block 1203, some embodiments extract columns from the table. Examples of this are described with respect to step one and FIG. 6B, where the table 600 has been parsed into the columns 603, 605, 607, and 609. Per block 1205, some embodiments extract rows from the table. Examples of this are described with respect to FIG. 6C where the table 600 is parsed into multiple rows. Per block 1207, some embodiments format the final output. Examples of this are described with respect to step 4 and FIG. 6B, where particular embodiments use a heuristic-based string merger.

Figure 13:
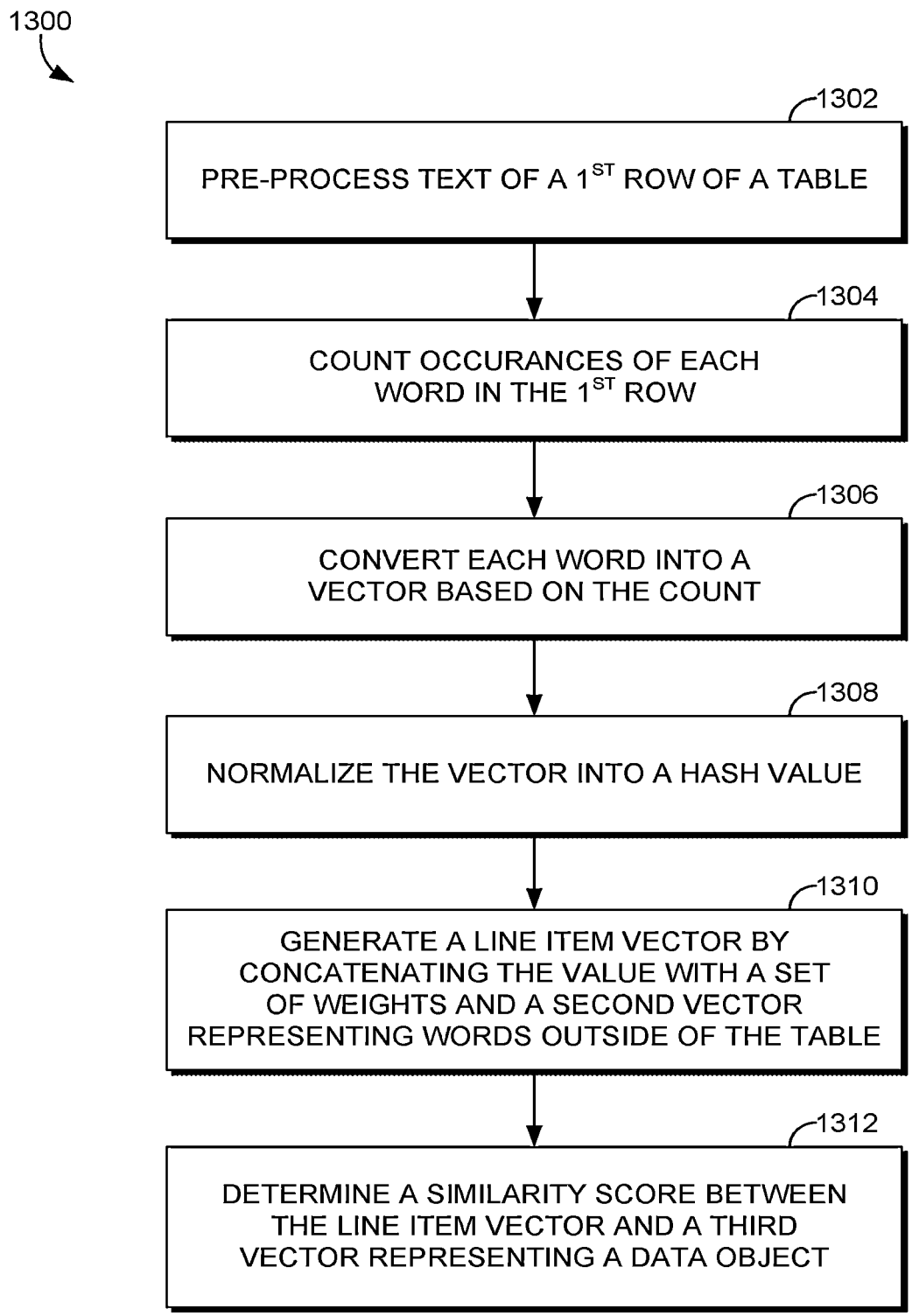
FIG. 13 is a flow diagram of an example process for calculating similarity scores, according to some embodiments.

FIG. 13 is a flow diagram of an example process 1300 for calculating similarity scores, according to some embodiments. In some embodiments, the process 1300 represents the functionality described with respect to block 1108 of FIG. 11. Per block 1302, some embodiments pre-process text of a first row of a table. Examples of this are described with respect to elements 805 and 807 of FIG. 8A. Per block 1304, some embodiments count the occurrences of each word in the first row. Examples of this are described with respect to the element 807 of FIG. 8A. For example, some embodiments determine that the word "chair" occurs 3 times in a row.

Per block 1306, some embodiments convert each word into a vector based on the count. Per block 1308, particular embodiments then normalize the vector into a hash value.

Examples of both of these steps are described with respect to the element 809 of FIG. 8A. For example, some embodiments express each word as a vector in feature space based on semantic similarity, which is weighted by the occurrences and then some embodiments hash the resulting vectors, such as through a Hashing Vectorizer.

Per block 1310, some embodiments generate a line item vector by concatenating the hash value with a set of weights and vector representing words outside of the table. Examples of this block 1310 are described with respect to FIG. 8B, where, for example, the vector representing 811 is multiplied by 0.8 and then added to the "GreenHashedVector," which is multiplied by 0.2. Per block 1312, some embodiments determine a similarity score between the line item vector and a third vector representing a data object. Examples of this are described with respect to FIG. 8C, where for example a similarity score between the line item vector representing row 811 and the data object "GL4" is 0.71, which indicates the highest similarity score relative to the other candidate categories. In some embodiments, the similarity score can include or be followed by determining the "priors" and then combining the similarity scores with SDE prior probabilities, as described with respect to FIG. 8C.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 14:
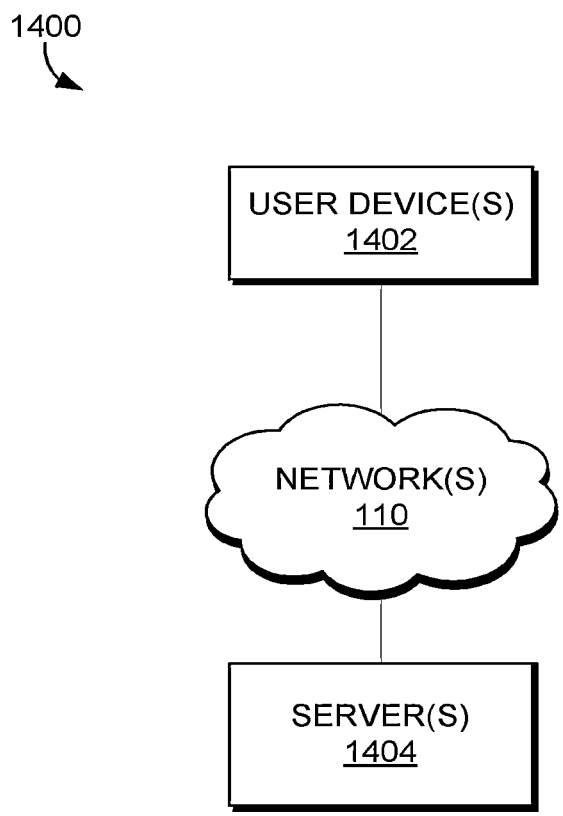
FIG. 14 is a block diagram of a computing environment in which aspects of the present technology are implemented within, according to some embodiments.

FIG. 14 is a block diagram of a computing environment 1400 in which aspects of the present disclosure are employed in, according to certain embodiments. Although the environment 1400 illustrates specific components at a specific quantity, it is recognized that more or less components may be included in the computing environment 1400. For example, in some embodiments, there are multiple user devices 1402 and multiple servers 1404, such as nodes in a cloud or distributing computing environment. In some embodiments, some or each of the components of the system 100 of FIG. 1 are hosted in the one or more servers 1404. In some embodiments, the user device(s) 1402 and/or the server(s) 1404 may be embodied in any physical hardware, such as the computing device 1500 of FIG. 15.

The one or more user devices 1402 are communicatively coupled to the server(s) 1404 via the one or more networks 110. In practice, the connection may be any viable data transport network, such as, for example, a LAN or WAN. Network(s) 110 can be for example, a local area network (LAN), a wide area network (WAN) such as the Internet, or a combination of the two, and include wired, wireless, or fiber optic connections. In general, network(s) 110 can be any combination of connections and protocols that will support communications between the control server(s) 1404 and the user devices 1402.

In some embodiments, a user issues a query on the one or more user devices 1402, after which the user device(s) 1402 communicate, via the network(s) 110, to the one or more servers 1404 and the one or more servers 1404 executes the query (e.g., via one or more components of FIG. 1) and causes or provides for display information back to the user device(s) 1402. For example, the user may issue a query at the user device 1402 that is indicative of an upload request to process a document to automatically populate a bookkeeping document. Responsively, the server(s) 1404 can perform functionality as described with respect to FIG. 1.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 15:
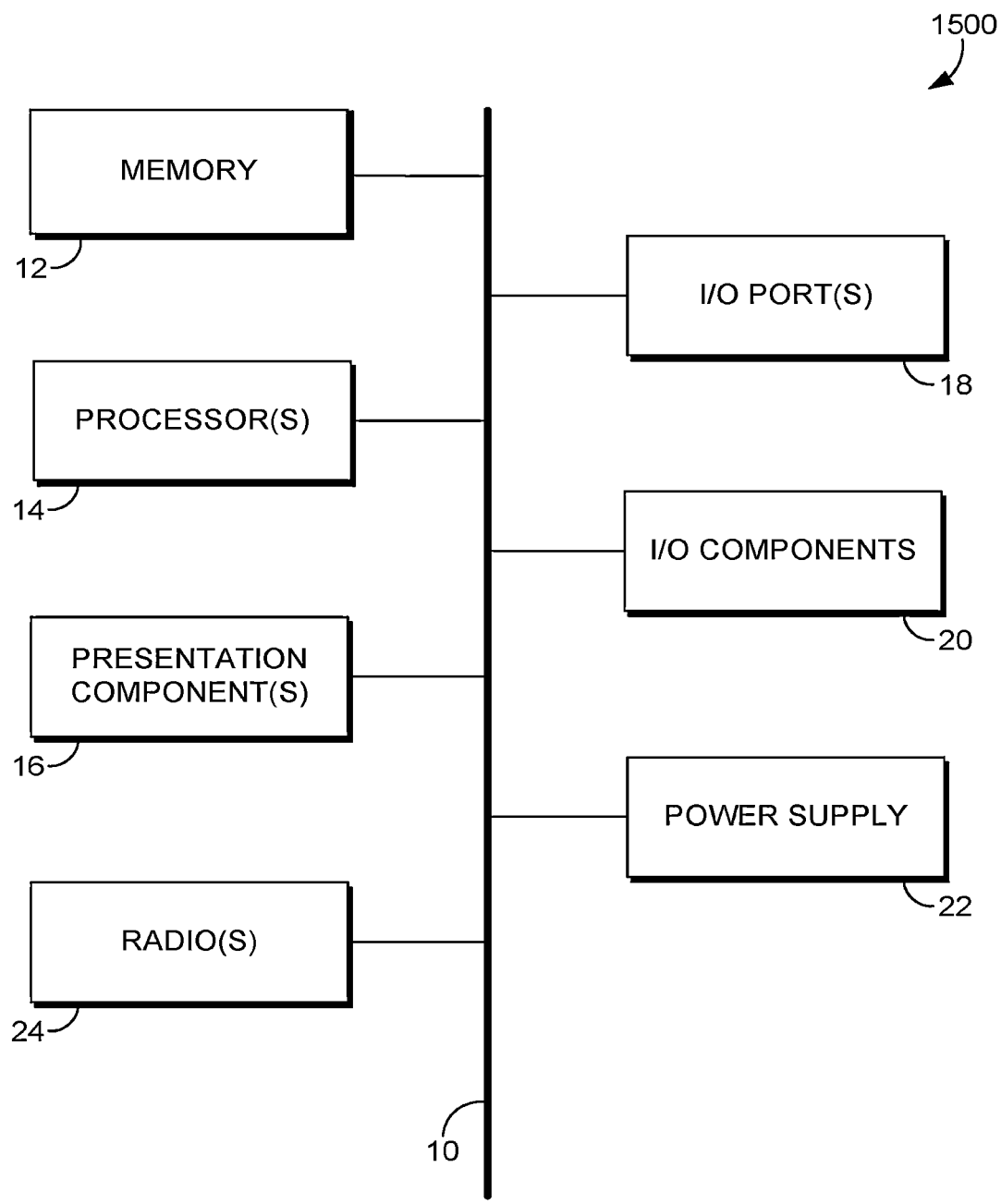
FIG. 15 is a block diagram of a computing device in which aspects of the present disclosure are implemented within, according to some embodiments.

With reference to FIG. 15, computing device 1500 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 15 and reference to "computing device."

In some embodiments, the computing device 1500 represents the physical embodiments of one or more systems and/or components described above. For example, the computing device 1500 can represent: the one or more user devices 1402, and/or the server(s) 1404 of FIG. 14. The computing device 1500 can also perform some or each of the blocks in the process 1100, 1200, 1300, and/or any functionality described herein with respect to FIGS. 1-14. It is understood that the computing device 1500 is not to be construed necessarily as a generic computer that performs generic functions. Rather, the computing device 1500 in some embodiments is a particular machine or special-purpose computer. For example, in some embodiments, the computing device 1500 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 1500 typically includes a variety of computer-readable media. Computer-readable media can be any available media that can be accessed by computing device 1500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1500 includes one or more processors 14 that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 800 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 1500. The computing device 1500 may be equipped with depth cameras, such as, stereoscopic camera systems, infrared camera systems, RGB camera systems, and combinations of these for gesture detection and recognition. Additionally, the computing device 1500 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computerized system comprising:
   one or more processors; and
   computer storage memory having computer-executable instructions stored thereon which, when executed by the one or more processors, implement a method comprising:
   receiving a first document associated with a user;
   determining a table within the first document;
   extracting a plurality of structural elements from the table, a first structural element comprising a first cost of a first good or service and a second structural element comprising a second cost of a second good or service;
   determining, via at least natural language processing (NLP), a first similarity score between a first set of words and a data object, the first set of words describing the first good or service and being included in the first structural element, the data object at least partially describes, in natural language and at a second document associated with the user, a first candidate category that the first set of words belong to, the candidate category not describing the first good or service but describing a good or service type that the first good or service belongs to, the first similarity score at least partially indicates semantic similarity between a first word, of the first set of words, and a second word in the data object;
   determining, via a least the NLP, a second similarity score between a second set of words and the data object, the second set of words describing the second good or service and being included in the second structural element, the second similarity score at least partially indicates semantic similarity between a third word of the second set of words and the second word in the data object;
   based at least in part on the first similarity score meeting a similarity threshold and the second similarity score not meeting the similarity threshold, applying an operation on the first cost but not the second cost resulting in an output cost; and
   based at least in part on the applying of the operation and the first similarity score meeting a threshold for the data object, copying the data object from the second document to a third document and providing the output cost at the third document in association with the data object.

2. The system of claim 1, wherein the determining of the table includes generating a set of bounding coordinates that defines the table by at least determining that the table is a line item table based on the line item table having a natural language description column and an amount column.

3. The system of claim 1, wherein the determining of the table is based on training, via a machine learning model, on multiple line item tables to detect the table.

4. The system of claim 1, wherein the determining of the table includes detecting a plurality of rows by deskewing an image of the table to assist with gridline detection of the table.

5. The system of claim 1, wherein the determining of the table includes determining that the table has lines that define the table in the first document and generating bounding box coordinates over the lines based on the determining that the table has lines.

6. The system of claim 1, wherein the determining of the table includes determining that the table does not have lines and generating bounding box coordinates over the first set of words and the second set of words based on the determining that the table does not have lines.

7. The system of claim 1, wherein the method of the system further comprises:
   extracting words outside of the table on the first document;
   determining that the words do not belong to the candidate category or any category indicated at the second document, and determining that the words belong to a second candidate category of a fourth document associated with the user; and
   in response to the determining that the words do not belong to the candidate category, generating, at the third document, a second data object that at least partially indicates the second candidate category.

8. The system of claim 1, wherein the determining of the first similarity score between the first set of words and the data object includes computing a first distance between a first feature vector and a second feature vector, the first feature vector being encoded and representing the first set of words, the second feature vector being encoded and representing the data object.

9. The system of claim 1, wherein the method of the system further comprises converting the first document into an image and using optical character recognition to determine characters a plurality of rows of the table.

10. A computer-implemented method comprising:
    receiving a first document associated with a user;
    determining a table within the first document;
    extracting a plurality of structural elements from the table, a first structural element comprising a first cost of a first good or service and a second structural element comprising a second cost of a second good or service;
    determining, via at least Natural language processing (NLP), a first similarity score between a first set of words and a data object, the first set of words describing the first good or service and being included in the first structural element, the data object at least partially indicates a first candidate category that the first set of words belong to, the candidate category not describing the first good or service but describing a good or service type that the first good or service belongs to, the first similarity score at least partially indicates semantic similarity between a first word, of the first set of words, and a second word in the data object;
    determining, via at least the NLP, a second similarity score between a second set of words and the data object, the second set of words describing the second good or service and being included in the second structural element;
    based at least in part on whether the first similarity score and the second similarity score meets a similarity threshold, applying an operation on at least one of the first cost or the second cost resulting in an output cost; and based at least in part on the applying of the operation and whether the first similarity score and the second similarity score meets the similarity threshold, copying the data object from the second document to a third document and providing the output cost at the third document.

11. The computer-implemented method of claim 10, wherein the applying of the operation includes aggregating the first cost and the second cost based on the first set of words and the second set of words being mapped to the data object.

12. The computer-implemented method of claim 10, wherein the applying of the operation includes dividing the first cost into a first sub-value and a second sub-value, and wherein the output cost includes at least one of: the first sub-value and the second sub-value.

13. The computer-implemented method of claim 10, wherein the applying of the operation includes copying the first cost from the first document to the data object at the second document, and wherein the first cost is the output cost.

14. The computer-implemented method of claim 10, wherein the determining of the table includes generating a set of bounding coordinates that defines the table and determining that the table is a line item table based on the line item table having a natural language description column and an amount column.

15. The computer-implemented method of claim 10, wherein the determining of the table is based on training, via a machine learning model, on multiple line item tables to detect the table.

16. The computer-implemented method of claim 10, wherein the extracting of the plurality of structural elements includes deskewing an image of the table to assist with gridline detection of the table.

17. The computer-implemented method of claim 10, further comprising determining that the table has lines that define the table in the first document, and wherein the determining of the table is based on the determining that the table has lines.

18. The computer-implemented method of claim 10, further comprising determining that the table does not have lines, and wherein the determining of the table is based on the determining that the table does not have lines.

19. One or more non-transitory computer readable storage mediums having computer-executable instructions embodied thereon that, when executed, by one or more processors, cause the one or more processors to perform a method, the method comprising:
receiving a plurality of documents associated with a user, each document describes, via one or more identifiers, one or more categories of item expenses;
subsequent to the receiving, receiving a first document associated with the user, the first document not being among the plurality of documents;
determining a table within the first document, wherein the table describes individual expenses of at least one of: multiple goods or multiple services;
extracting a plurality of structural elements from the table, a first structural element comprising a first cost of at least one of a first good or a first service and a second structural element comprising a second cost of at least one of a second good or a second service;
determining, via a least Natural Language Processing (NLP), a first similarity score between a first set of words and a data object, the first set of words describes, in natural language, at least one of the first good or first service and being included in the first structural element, the data object at least partially describes, in natural language, a candidate category that the first set of words belong to, the candidate category not describing at least one of the first good or the first service but describing at least one of a good type or a service type that the first good or first service belongs to, the first similarity score at least partially indicates a semantic similarity between a first word, of the first set of words, and a second word in the data object;
based at least in part on the first similarity score meeting a similarity threshold, applying an operation on the first cost resulting in an output cost; and
based at least in part on the applying of the operation and the first similarity score meeting the similarity threshold, generating a third document that includes the data object from the second document and the output cost.

20. The one or more non-transitory computer readable storage mediums of claim 19, wherein the applying of the operation includes aggregating the first cost and the second cost based on the first set of words and a second set of words included in the second structural element being mapped to the data object.

* * * * *